(12) United States Patent
Hole

(10) Patent No.: US 9,414,269 B2
(45) Date of Patent: Aug. 9, 2016

(54) SYSTEMS AND METHODS OF TRANSMITTING MEASUREMENT REPORTS

(75) Inventor: David Philip Hole, Slough (GB)

(73) Assignee: BlackBerry Limited, Waterloo, Ontario (CA)

( * ) Notice: Subject to any disclaimer, the term of this patent is extended or adjusted under 35 U.S.C. 154(b) by 505 days.

(21) Appl. No.: 12/780,680

(22) Filed: May 14, 2010

(65) Prior Publication Data

US 2011/0281583 A1 Nov. 17, 2011

(51) Int. Cl.
*H04W 36/00* (2009.01)
*H04B 1/00* (2006.01)
*H04B 7/00* (2006.01)
*H04L 1/00* (2006.01)
*H04W 24/10* (2009.01)
*H04W 72/04* (2009.01)
*H04W 84/04* (2009.01)

(52) U.S. Cl.
CPC ......... *H04W 36/0055* (2013.01); *H04L 1/0026* (2013.01); *H04W 24/10* (2013.01); *H04W 36/0088* (2013.01); *H04W 72/0413* (2013.01); *H04W 84/045* (2013.01)

(58) Field of Classification Search
CPC ... H04L 1/0026; H04L 1/0027; H04L 5/0057; H04L 1/0028; H04L 1/1861; H04W 24/10; H04W 72/0413; H04W 24/00; H04W 48/18; H04W 28/08; H04W 72/085; H04B 17/24; H04B 7/0632; H04B 7/0417; H04B 7/0626
USPC ........ 455/67.11, 436–444, 423, 424, 69, 522, 455/67.13; 370/331
See application file for complete search history.

(56) References Cited

U.S. PATENT DOCUMENTS

| | | | |
|---|---|---|---|
| 7,076,274 B2 * | 7/2006 | Jollota et al. | 455/561 |
| 8,099,055 B2 * | 1/2012 | Bonneville et al. | 455/67.11 |
| 8,498,639 B2 * | 7/2013 | Chen et al. | 455/434 |
| 2008/0101280 A1 * | 5/2008 | Gholmieh | H04L 1/0026 370/328 |

(Continued)

FOREIGN PATENT DOCUMENTS

| | | |
|---|---|---|
| CN | 101536569 | 9/2009 |
| EP | 2028906 A1 | 2/2009 |

(Continued)

OTHER PUBLICATIONS

3GPP TS 44.060 v.9.3.0. "General Packet Radio Service (GPRS); Mobile Station (MS)—Base Station System (BSS) Interface; Radio Link Control / Medium Access Control (RLC/MAC) Protocol (Release 9)", Mar. 2010.

(Continued)

*Primary Examiner* — Olumide T Ajibade Akonai
(74) *Attorney, Agent, or Firm* — Fish & Richardson P.C.

(57) ABSTRACT

Systems and methods for transmission of measurement reports are provided. In some cases, once a mobile station transmits a measurement report for a cell, such as an uncontrolled cell, then the mobile station transmits some further minimum number of measurement reports. In some cases, a mobile station can only transmit measurement reports for a cell up to some maximum or for some specified time. The mobile station transmits measurement reports using two formats. In the first, the cell is identified using routing parameters; in the second, the cell is not identified using routing parameters. The network is able to associate messages sent using the two formats.

19 Claims, 8 Drawing Sheets

(56) References Cited

U.S. PATENT DOCUMENTS

| | | | |
|---|---|---|---|
| 2008/0130584 A1* | 6/2008 | Pani et al. | 370/332 |
| 2010/0113057 A1* | 5/2010 | Englund et al. | 455/452.1 |
| 2010/0188985 A1* | 7/2010 | Ishii et al. | 370/252 |
| 2010/0222008 A1* | 9/2010 | Astely et al. | 455/67.11 |
| 2011/0105119 A1* | 5/2011 | Bienas et al. | 455/436 |
| 2011/0281583 A1* | 11/2011 | Hole | 455/436 |

FOREIGN PATENT DOCUMENTS

| | | |
|---|---|---|
| JP | 2009-232293 | 10/2009 |
| JP | 2009232293 | 10/2009 |
| WO | 2008054775 A2 | 5/2008 |
| WO | 2008/157800 | 12/2008 |
| WO | 2009/021572 | 2/2009 |
| WO | 2009021572 | 2/2009 |
| WO | 2009155576 A1 | 12/2009 |

OTHER PUBLICATIONS

3GPP TS 44.018 v.9.4.0. "Mobile Radio Interface Layer 3 Specification; Radio Resource Control (RRC) Protocol (Release 9)", Mar. 2010.

GP-100746 CR 44.060-1338 rev 2 "Introduction of inbound mobility to CSG cells", Nokia Siemens Networks, Nokia Corporation, 3GPP TSG GERAN #46, May 17-21, 2010, Jeju, South Korea.

G2-100216 CR 44.018-0854 Introduction of inbound mobility to CSG cells, Nokia Corporation, Nokia Siemens Networks, Apr. 21-23, 2010.

GP-100747 CR 44.060-1416 Introduction of inbound mobility to CSG cells, Nokia Siemens Networks Corporation, May 17-21, 2010.

TSG-RAN WG2: "Intra-frequency measurement correction", 3GPP Draft; R2-012213, 3rd Generation Partnership Project (3GPP), Mobile Competence Centre, vol. RAN WG2, no. Helsinki, Finland; Sep. 14, 2001, XP050118970.

LG Electronics Inc: "How to handle an MS inbound mobility toward H(e)NG", 3GPP Draft; GP-100164 How to Handle an MS, 3rd Generation Partnership Project (3GPP), Mobile Competence Centre: vol. TSG GERAN, no. Berlin; Mar. 1, 2010, Feb. 24, 2010, XP050416604.

NTT Docomo et al: "CR to 36.331 on CSG identity reporting", 3GPP Draft; 36.331_CR0343R1-(REL-9)_R2-101531_SCG ID Reporting CR, 3rd Generation Partnership Project (3GPP), Mobile Competence Centre, vol. RAN WG2, no. San Francisco, USA; Feb. 22, 2010, Feb. 16, 2010, XP050421706.

LG Electronics Inc: "Efficient measurement report mechanism toward CSG cell in GERAN", 3GPP Draft; GP-100165 Efficient CSG Cell Measurement Reporting Mechanism in GERAN, 3rd Generation Partnership Project (3GPP), Mobile Competence Centre, vol. TSG GERAN, no. Berlin; Mar. 1, 2010, Feb. 25, 2010, XP050146647.

Nokia Corporation et al: "Supporting PCCO to CSG cells in REL-9", 3GPP Draft; GP-100774, 3rd Generation Partnership Project (3GPP), Mobile Competence Centre, vol. TSG GERAN, no. Jeju; May 17, 2010, May 13, 2010, XP050417152.

Nokia Corporation et al: "Inclusion of CSG ID in Measurement Reports", 3GPP Draft; GP-100272_CSGID_IN_MR, 3rd Generation Partnership Project (3GPP), vol. TSG GERAN, no. Berlin; Mar. 1, 2010, Feb. 24, 2010, XP050416624.

Nokia Corporation et al: "Introduction of inbound mobility to CSG cells", 3GPP Draft; GP-100745_CR_44018_CSG_Inbound_Mobility_REL-9_REV1, 3rd Generation Partnership Project (3GPP), Mobile Competence Centre; vol. TSG GERAN, no. Jeju; May 17, 2010, May 12, 2010, XP050417062.

Invitation to Pay Additional Fees which includes a Partial International Search, from corresponding PCT/EP2011/057752 filed on May 13, 2011, and was issued on Aug. 11, 2011 (10 pages).

International Search Report and Written Opinion from corresponding PCT/EP2011/057752 filed on May 13, 2011, and was issued on Oct. 5, 2011 (34 pages).

English abstract for JP2009232293; published on Oct. 8, 2009 and retrieved on Jan. 29, 2014.

Office Action issued in Chinese Application No. 201180034632.4 on Feb. 9, 2015; 7 pages.

Office Action issued in Chinese Application No. 201180034632.4 on Oct. 26, 2015; 3 pages.

Office Action issued in Japanese Application No. 2014-237454 on Oct. 20, 2015; 3 pages.

Communication Pursuant to Article 94(3) EPC issued in EP Application No. 11721470.0 on Dec. 16, 2015; 7 pages.

Office Action issued in CA Application No. 2,799,128 on Jan. 14, 2016; 4 pages.

\* cited by examiner

SYSTEMS AND METHODS OF TRANSMITTING MEASUREMENT REPORTS

FIELD

The application relates to systems and methods of transmitting measurement reports.

BACKGROUND

In GERAN (GSM Edge Radio Access Network), measurement reports (i.e. messages containing signal strength/quality measurements of neighbouring cells) are sent in fixed-size messages. Each message is approximately 20 octets in length, and typically contain information for around 6 cells.

Some measurement reports in GERAN do not explicitly indicate the RAT (radio access technology) of the measured cell: instead, frequency indices are used and the range (0-31) is split into GSM (Global System for Mobile Communications), UMTS (Universal Mobile Telecommunications System), E-UTRAN (Evolved UMTS Terrestrial Radio Access Network).

The network can signal measurement reporting criteria (e.g. minimum signal strength and/or quality); if a cell does not fulfil these criteria, the mobile shall not report that cell in a measurement report. If more cells meet the criteria than can be included in a single report, a prioritisation scheme is specified (some parameters of this prioritisation may be signalled by the network).

Some cells are uncontrolled in the sense that a PLMN (public land mobile network) operator does not control the location/operation of the cell. Other cells are controlled in the sense that the operator does control the location/operation of the cells. Examples of uncontrolled cells include, for example, CSG (closed subscriber group) cells, cells controlled by home enode b's and home node b's. These cells are also sometimes referred to as being "uncoordinated" in the sense that they are not subject to normal radio/cell planning.

It is generally understood that there are many methods of performing a handover for controlled cells. Handover in this context refers to a cell change where resources (for example timeslots, frequency channels, scrambling codes, etc.) for transmission and/or reception in a target cell are allocated to a mobile station in advance of the mobile station performing a cell change to that cell, particularly in response to a request from the controller of the device's serving cell.

While the uncontrolled cells may be configured to use spectrum that is owned by the operator, the network operator does not have the same control over uncontrolled cells as for controlled cells. Typically, the network operator does not own the support structure (towers etc.), does not own or control the backhaul connection (e.g. Digital Subscriber Line (DSL) connections), does not know or control when a given uncontrolled cell is going to be switched on, and/or may not know or control the locations of uncontrolled cells. The operator will typically still have control of various parameters such as operating frequency, transmit power, etc. if the operator owns the spectrum license.

In order to perform a handover to a target cell, controlled or uncontrolled, a MS (mobile station) typically needs to provide identifying information relating to the target cell to the current serving cell so that it can initiate handover process. In particular, the current serving cell needs to be able to communicate with (possibly via a core network) the cell controller for the target cell. However, the current serving cell may not be aware of how to reach the cell controller for a target uncontrolled cell, unless provided with explicit identification information for the cell (such as a cell global identity). This makes handover to such cells difficult. In contrast, for a controlled target cell, it may be sufficient for the mobile station to provide the current serving cell with information about the target cell which does not require or cause the acquisition of any broadcast information from the target controlled cell for the serving cell to be able to reach the cell controller for the target controlled cell, since the serving cell or some part of the network may be able to map other identifying features of the cell (such as operating frequency, scrambling code etc.) to the identity of the target cell or its controller.

A cell controller may not necessarily map physical layer identities (such as frequency, spreading code, etc.) of an uncontrolled cell (more generally, another cell) to the identity of its respective controller (or to an identifier which can be used elsewhere in the core network to route messages to the target controller).

In general therefore, it is expected that, for handover to an uncontrolled cell, the mobile station will have to provide more identification information regarding the target cell than in the case of handover to a controlled cell.

Identification of CSG cells in measurement reports is accomplished through the inclusion of "routing parameters". These routing parameters are used by the serving cell controller to contact the target cell's controller and reserve resources and request a handover command message. The MS typically obtains these in advance of sending the measurement report by reading the broadcast system information of the target cell; it may also have this information stored.

Some existing measurement report messages identify cells (in part) using a "frequency index" (0 . . . 31), each frequency index representing a regular (i.e. non-CSG) physical carrier frequency. An index may be used for (at most one of) GSM, UMTS or E-UTRAN frequencies. The mapping of index to physical frequency is based on complex rules for processing neighbour cell lists (NCLs) received by the mobile station.

BRIEF DESCRIPTION OF THE DRAWINGS

Embodiments of the disclosure will now be described with reference to the attached drawings in which.

DETAILED DESCRIPTION

Figure 1:
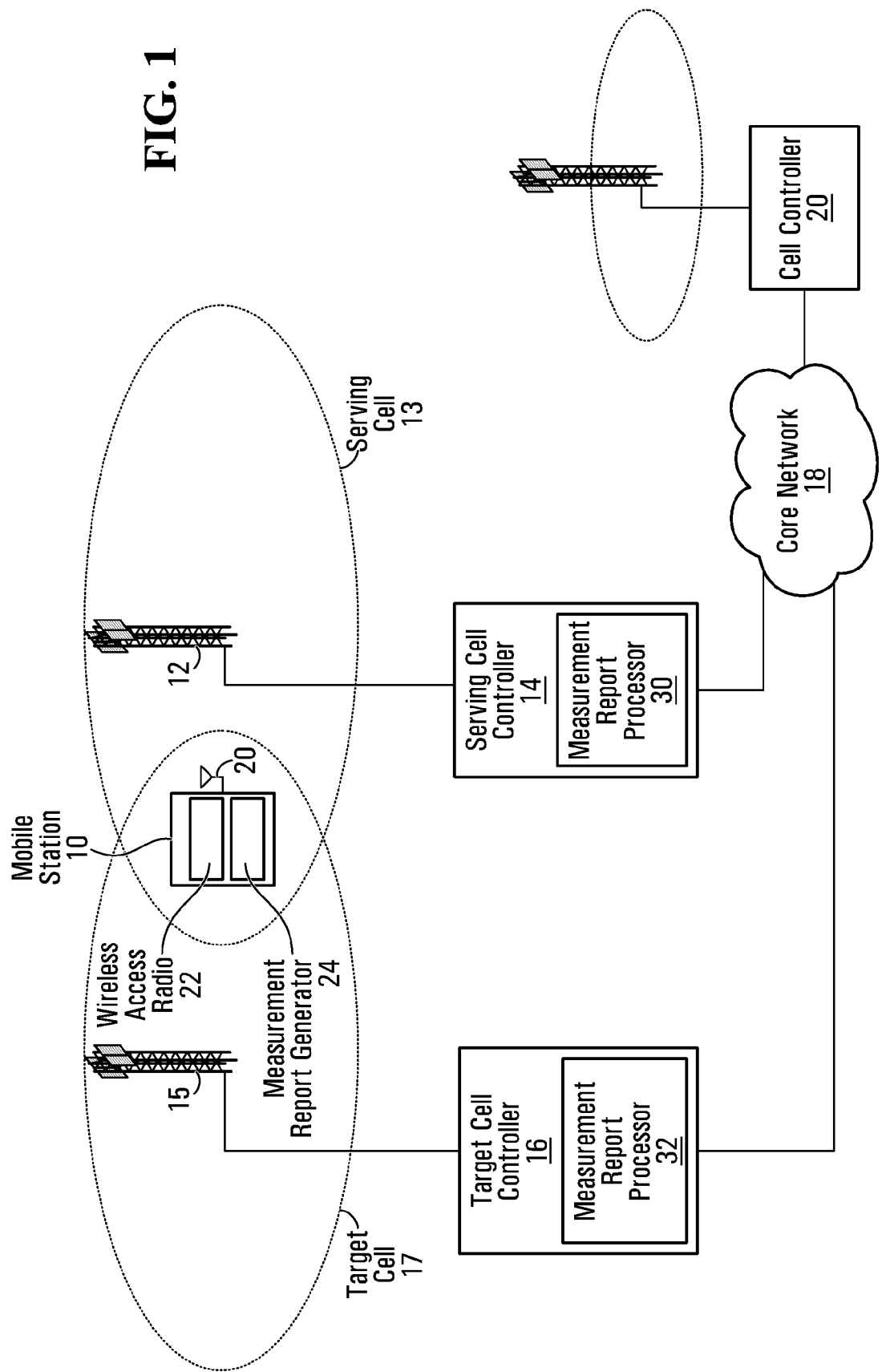
FIG. 1 is a schematic diagram of a mobile station having a measurement report generator in communication with a target cell controller having a measurement report processor.

It should be understood at the outset that although illustrative implementations of one or more embodiments of the present disclosure are provided below, the disclosed systems and/or methods may be implemented using any number of techniques, whether or not currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disadvantageously, the inclusion of the routing parameters takes up a lot of space in measurement report messages and may significantly reduce the number of cells that can be reported.

Furthermore, the number of measurement reports required for the network to trigger a handover attempt is not known by the mobile station. On the one hand, the mobile station may continue to report information for a CSG cell for a long period of time, when there is no likelihood that the network will perform a handover; during this time, measurement reports for other cells are prevented or severely limited, for example, to the extent that only a single other cell can be reported.

Since a network is unlikely to initiate a handover to a cell for which it has not received a measurement report, this will severely limit the possibility of handover to cells other than the CSG cell being reported (including to other CSG cells). This could also cause problems for the network, if it wishes to move the device to another suitable cell (e.g. a UTRAN or E-UTRAN cell), for instance, for load-balancing reasons.

On the other hand, if the mobile station ceases sending of measurement reports for CSG cells early, it may not be sufficient to trigger a handover, in accordance with (implementation-specific) handover algorithm used by the serving cell controller.

In some embodiments, parameters are defined which control one or more of:

a) the minimum number of reports that should be sent for a single cell;

b) the maximum number of reports that should be sent for a single cell;

c) maximum time window during which to send reports for a single cell;

d) minimum number of reports that should contain routing parameters;

e) maximum number of reports that should contain routing parameters;

f) which and how many reports should contain routing parameters.

As indicated above, some existing measurement report messages identify cells (in part) using a "frequency index" (0 . . . 31), each frequency index representing a physical carrier frequency. An index may be used for (at most one of) GSM, UMTS or E-UTRAN frequencies. The mapping of index to physical frequency is based on complex rules for processing neighbour cell lists (NCLs) received by the mobile station.

However, CSG cells may use a frequency which is used only for CSG cells (and not for non-CSG cells). Since such frequencies may not be allocated a frequency index according to the current rules (e.g. because such frequencies are not listed in existing neighbour cell lists, or are not processed when constructing the index mapping), it is not possible to report such cells using such egacy measurement reports.

Similarly, in some existing measurement report messages cells are identified by means of an index to a neighbour cell list, which is derived from neighbour cell information transmitted by the serving cell controller. However, CSG cells are typically not included in such lists and hence do not have a corresponding index.

In some embodiments, a frequency index (or other index or identifier(s)) is used to indicate a cell such as an uncontrolled cell in a measurement report that does not contain routing parameters. In some cases this index or identifier is included in the full measurement report containing routing parameters. Then measurement reports that use the frequency index (or other index or identifier) are transmitted without the routing parameters. The index or identifier is such that there is no ambiguity with any neighbor cell.

According to one broad aspect, the application provides a method comprising: detecting a cell and performing signal strength measurements in respect of the cell; in respect of a cell, so long as that cell continues to meet measurement reporting criteria relating to at least one of received signal strength and quality, transmitting measurement reports in respect of the cell, and if a first constraint condition on measurement report transmission in respect of the cell is satisfied then refraining from transmitting measurement reports in respect of the cell using a first measurement report format.

According to another broad aspect, the application provides a method comprising: detecting a cell and performing signal strength measurements in respect of the cell; in respect of a cell, transmitting at least one measurement report using a first measurement report format; in respect of the cell, transmitting at least one measurement report using a second measurement report format.

According to a another broad aspect, the application provides a method in a mobile station, the method comprising: detecting a cell and performing signal strength measurements in respect of the cell; if the mobile station sends a measurement report for a cell which it has not reported within the preceding defined time period, at least until a defined minimum in respect of measurement reporting is satisfied continuing to transmit measurement reports for the cell while the cell meets the applicable measurement reporting criteria.

According to a another broad aspect, the application provides a method in a wireless network, the method comprising transmitting at least one parameter over the air that specifies mobile station behaviour in terms of measurement report transmission.

According to another broad aspect, the application provides a method in a wireless network comprising: receiving first measurement reports in respect of a cell using a first measurement report format; receiving second measurement reports in respect of the cell using a second measurement report format; associating the second measurement reports with the first measurement reports.

The embodiments described below all relate to the transmission of measurement reports in respect of a cell. In the detailed examples below, the cell concerned is an uncontrolled cell, and in some cases specifically the cell is referred to as being a CSG cell; in some embodiments the methods are applied specifically to uncontrolled cell. However, it is to be clearly understood that in other embodiments, the methods described are applied to a cell generally that may or not be an uncontrolled cell, and that may or may not be a CSG cell. In some cases the methods are applied to a first class of cells such as uncontrolled cells or a particular type of controlled cells, and are not applied to a second class of cells such as controlled cells.

The embodiments below make reference to measurement reports that contain routing parameters. More generally, wherever there is a reference to a measurement report that contains routing parameters, measurement reports that use a first measurement report format are contemplated. A specific example of a first measurement report format is a format that includes routing parameters. Another example of a first measurement report is a format that allows the network to identify the cell for which the measurement report is being sent without relying on a previous measurement report transmission from the mobile station.

The embodiments below make reference to measurement reports that do not contain routing parameters. More generally, wherever there is a reference to measurement reports that do not contain routing parameters, measurement reports that use a second measurement report format are contemplated. A specific example of a second measurement report format is a format that does not include routing parameters. The second measurement report may involve an index or other indicator that avoids ambiguity with neighbor cells.

In some embodiments, the second measurement report format is a format that is more concise than the first measurement report format.

Referring to FIG. 1, shown is a schematic diagram in which a mobile station 10 has a wireless connection to a serving cell transceiver 12 within serving cell 13. Also shown is a serving cell controller 14, target cell transceiver 15 with target cell 17, and target cell controller 16. Of course, other network elements may be present, such as core network elements 18 and other cell controllers 20. The core network elements may, for example, include one or more of an SGSN (serving GPRS support node), MSC (mobile switching centre), MME (mobility management entity). The signalling over the air interface (between a transceiver and a mobile station) is typically performed at the RLC (radio link control)/MAC (medium access control) layer. Signalling between a BSS and core network is separate from RLC/MAC.

The serving cell controller 14 is configured with a measurement report processor 30 that enables the serving cell controller to perform one or a combination of two or more of the serving cell controller methods described herein. The methods implemented in the measurement report processor include one or more of:

a) signalling one or more of the parameters described below to a mobile station; this can be in broadcast signalling or mobile station specific signalling; however, in some cases the parameters are set, and known to the mobile station and (optionally) the network without requiring over the air signalling;

b) receiving and processing measurement reports from a cell that use two different measurement report formats, for example receiving and processing measurement reports that contain routing information and receiving and processing measurement reports that do not contain routing information. This may include associating the measurement reports for a cell in messages that do not contain routing information with measurement reports for a cell in messages that do contain routing information;

c) performing handoff control as a function of received measurement reports.

d) receiving lists of neighbour cells and/or frequencies, for example to allow "unused" or unambiguous identifiers to be selected or recognized.

The measurement report processor 30 may be implemented in hardware, or software running on a processing platform such as a processor or combination of processors, or a combination of hardware and software. The measurement report processor 30 may be implemented as part of/a change to another component forming part of a serving cell controller. The serving cell controller 14 includes other components (not shown) to allow it to perform the serving cell controller functionality. More generally, one or a combination of network components include functionality of the measurement report processor.

The target cell controller 16 is similarly configured with a measurement report processor 32 The target cell controller 16 includes other components (not shown) to allow it to perform the target cell controller functionality.

The mobile station 10 has at least one antenna 20, and at least one wireless access radio 22. In addition, them mobile station is configured with a measurement report generator 24 that enables the mobile station to perform one or a combination of two or more of the mobile station methods described herein. The measurement report generator 24 may be implemented in hardware, or software running on a processing platform such as a processor or combination of processors, or a combination of hardware and software. The measurement report generator 24 may be implemented as part of/a change to another component forming part of a mobile station. The mobile station 10 includes other components (not shown) to allow it to perform mobile station functionality.

In some embodiments, a new parameter is defined and made known to the mobile station (may be signalled or specified) that specifies a maximum number of measurement reports per cell to send (N_max). In some embodiments, the network sets this value so that, having received N_max measurement reports and determined not to initiate a handover, the probability that it would initiate a handover if it subsequently (immediately afterwards) received further reports for that cell is very low.

In some embodiments, a new parameter is defined and made known to the mobile station (may be signalled or specified) that specifies a minimum number N_min of measurement reports per cell to send. In some embodiments, the network sets this value to be greater than or equal to the minimum number of measurement reports for a cell required to trigger a handover attempt according to its handover trigger algorithm. Once a first measurement report has been sent for a particular cell, after not having sent a report for some time for that cell, the mobile station sends at least N_min−1 further reports (i.e. sending N_min reports in total) for the same cell, if that cell continues to meet the appropriate measurement reporting criteria.

In some embodiments N_max, and N_min are both used, and N_min<=N_max.

In some embodiments, a new parameter is defined and made known to the mobile station (may be signalled or specified) that specifies a minimum number N_RP_min of reports to be sent which contain routing parameters. This parameter can be set to ensure with high probability that at least one measurement report containing routing parameters is received by the network.

In some embodiments, N_min and N_RP_min are both used, and N_min<=N_RP_min. In some embodiments, N_min and N_RP_min are both used, and N_min<N_RP_min. In some embodiments, N_min and N_RP_min are both used, and N_min>N_RP_min.

In some embodiments, N_min, N_RP_min, N_max are both used, and N_RP_min<=N_max. In some embodiments, where both N_RP_min and N_max are used, N_RP_min is less than N_max.

In some embodiments, N_min, N_RP_min, N_max are all used.

In another embodiment, measurement reports are transmitted in accordance with a defined sequence of reports that contain or do not contain routing parameters. This sequence is known to both the mobile station and the network. In a first example, at least the parameter N_max is used, and the first two (more generally first N) messages of a set of N_max messages contain routing parameters and remaining ones do not. In a second example every Nth message contains routing parameters and remaining ones do not. In a third example, at least the parameter N_min is used, and the first and the N_min-th message messages contain routing parameters. In some embodiments, at least the first in the sequence contains the full routing parameters.

In some embodiments, the parameter N_max is used, and once a sequence of N_max reports have been sent, the mobile station is prohibited from sending measurement reports containing routing parameters for that cell for a specified period; the mobile station may continue to include a report (excluding routing parameters) for that cell; after this period, the mobile station may repeat the procedure from the beginning.

In some embodiments, the parameter N_max is used, and once a sequence of N_max reports have been sent, the mobile station refrains from reporting that cell at all for a specified period.

In some embodiments, one or more of the conditions for constraining transmission of measurement reports comprise in part that it is not possible to report all cells that meet measurement reporting criteria in a single measurement report message. If it is possible to report all cells that meet measurement reporting criteria in a single measurement report message, there is no need to refrain from sending measurement reports in respect of a given cell.

Figure 2:
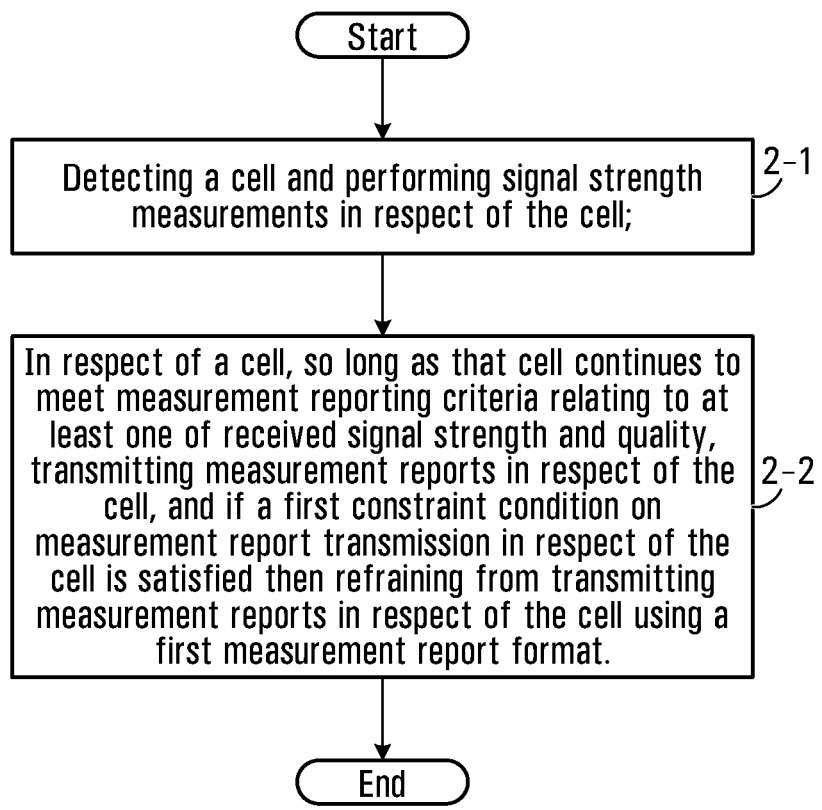
FIG. 2 is a flowchart of a method of generating measurement reports by a mobile station.
Figure 8:
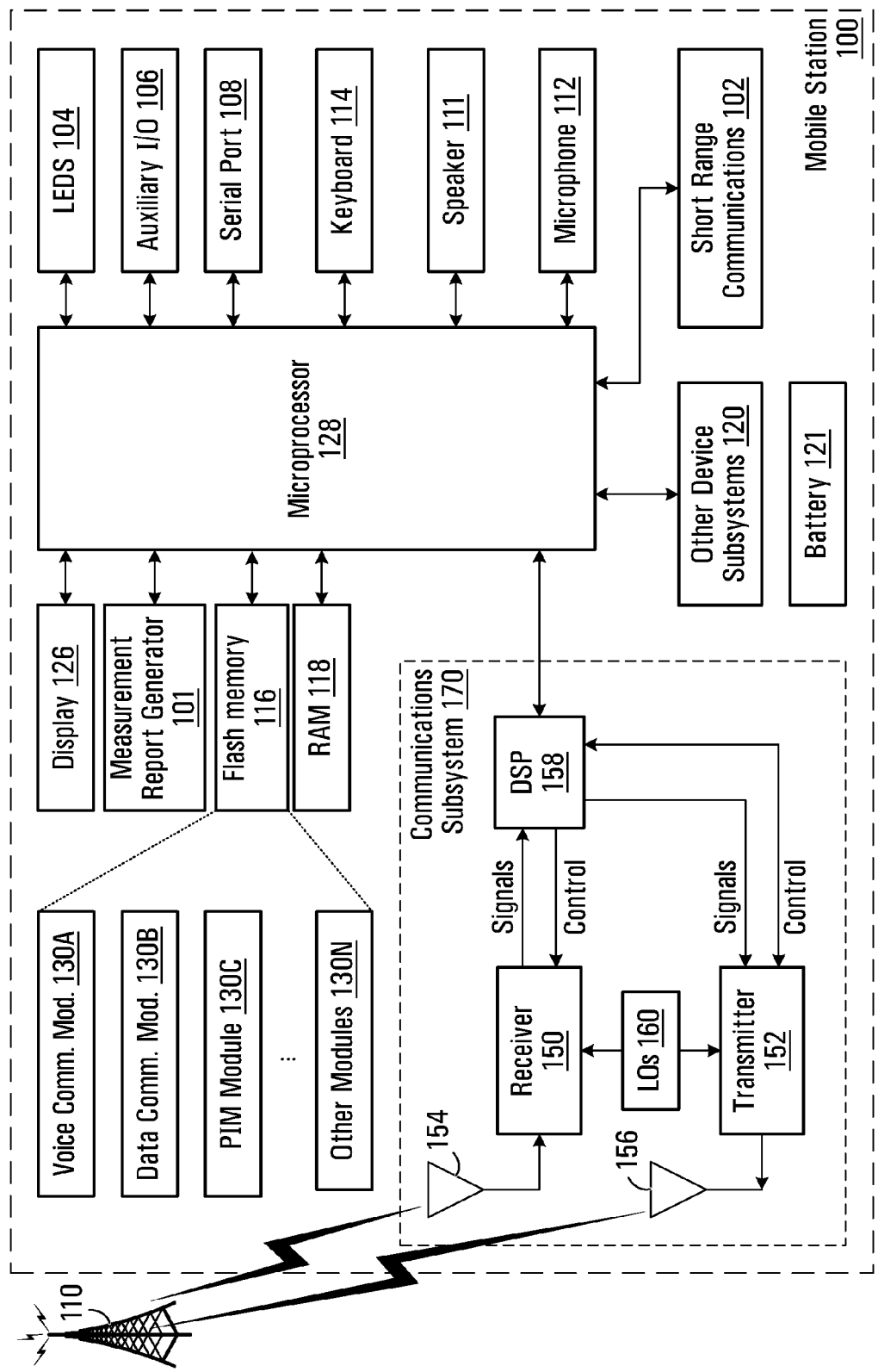
FIG. 8 is a block diagram of another mobile station.

Referring now to FIG. 2, shown is a flowchart of a method for execution by a mobile station, such as but not limited to mobile station 10 of FIG. 1 or mobile station 100 of FIG. 8. In block 2-1, the mobile station detects a cell and performing signal strength measurements in respect of the cell. In block 2-2, in respect of a cell, so long as that cell continues to meet measurement reporting criteria relating to at least one of received signal strength and quality, the mobile station transmits measurement reports in respect of the cell, and if a first constraint condition on measurement report transmission in respect of the cell is satisfied then the mobile station refrains from transmitting measurement reports in respect of the cell using a first measurement report format. The "constraint condition" is referred to as such as it is a condition which, if satisfied, results in a constraint of some sort on further measurement report transmission; in this case, the constraint is that the mobile station refrain from transmitting measurement reports using a first measurement report and as such is a limiting constraint; in other cases described below, the constraint sets a minimum in terms of time or number of measurement reports.

In this and other embodiments described herein, the transmission of a measurement report in respect of a cell means that the measurement report contains measurements at least for that cell. This does not preclude the same measurement report containing measurements for another cell or cells, assuming that a format/size used to for the measurement report accommodates this.

Figure 3:
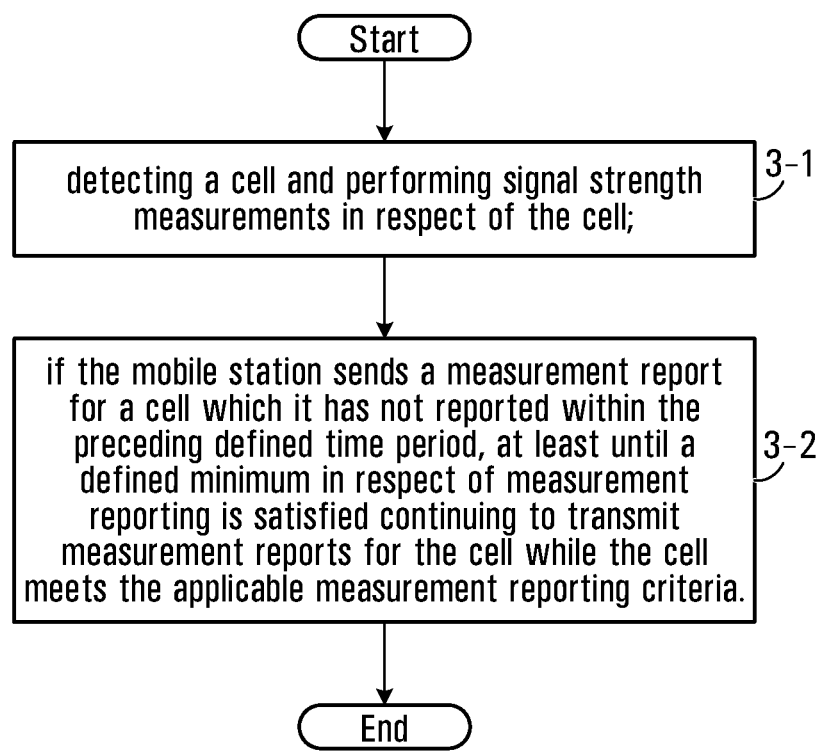
FIG. 3 is a flowchart of another method of generating measurement reports by a mobile station.

Referring now to FIG. 3, shown is a flowchart of a method for execution by a mobile station, such as but not limited to mobile station 10 of FIG. 1 or mobile station 100 of FIG. 8. In block 3-1, the mobile station detects a cell and performs signal strength measurements in respect of the cell. In block 3-2, if the mobile station sends a measurement report for a cell which it has not reported within a preceding defined time period and at least until a defined minimum in respect of measurement reporting is satisfied the mobile station continues to transmit measurement reports for the cell while the cell meets the applicable measurement reporting criteria.

Figure 4:
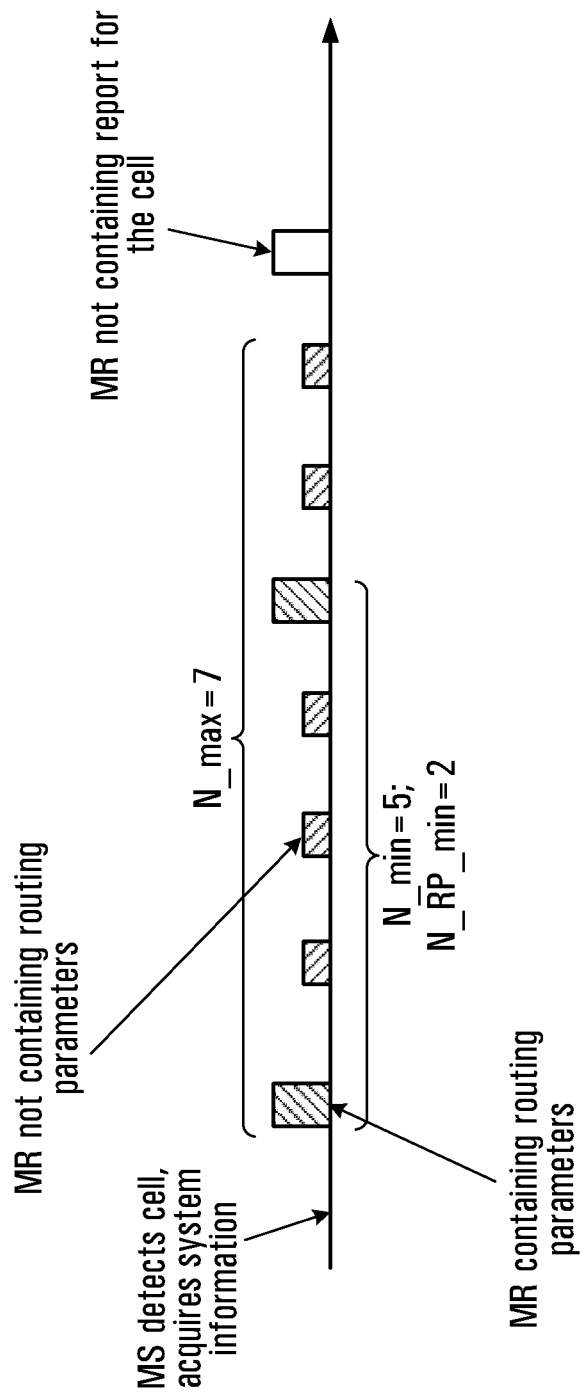
FIG. 4 shows an example of a sequence of measurement reports some of which contain routing parameters and some of which do not.

FIG. 4 shows a detailed example of a sequence of measurement reports where N_min=5, N_max=7, and N_RP_min=2, and where the a defined sequence is such that the first and N_minth measurement reports are to contain routing parameters is used. In this example, it can be seen that the first and fifth measurement reports contain routing parameters, the second, third, fourth, sixth and seventh measurement reports do not contain routing parameters, and the next measurement report does not contain a report for that cell.

In some embodiments, rather than using a maximum number (N_max), a maximum duration is specified. In some embodiments, rather than using a minimum number N_min, a minimum duration is specified. This may be appropriate, for example, in scenarios where measurement reports are not sent with a fixed periodicity.

In some embodiments, where two or more parameters are used, one or more of the parameters is defined as a function of one or more of the other parameters. In a specific example, where N_min and N_max are used, N_min can be specified as N_min=N_max−2. This may reduce the amount of signaling to specify all the parameters in the event the parameters are defined using over the air signaling.

In some embodiments, where a defined sequence of measurement reports that do and do not contain routing information is employed, at least some of the measurement reports contain an indicator of where in the "sequence" they are. This may for example be included only in measurement reports that include routing parameters. This may allow the network to reconstruct the sequence in case of measurement reports that it could not decode. For example, if the network receives a report that indicates that it is the 4th report in the sequence for that cell, the network can determine that the cell was reported in 3 previous reports, even though the first such measurement report may not have been received and therefore had met the reporting criteria for the duration since it can conclude that the first measurement report was sent.

In some embodiments, for at least one measurement report, the measurement report includes an indication of where the measurement report is in a sequence of measurement reports. In this case, the sequence of measurement reports is not necessarily a defined sequence of reports that do and do not contain routing parameters.

The network is able to associate measurement reports containing routing parameters in respect of a cell with other measurement reports that do not contain routing parameters for that cell. In some embodiments, an index or identifier is used by the mobile station to allow the network to fully associate measurement reports that do not contain routing parameters with cells being fully identified in measurement reports containing routing parameters. This index or identifier may, for example, be included in the measurement report(s) that contain routing parameters. This provides a link between reports containing routing parameters and reports of the same cell that do not contain routing parameters. This index or identifier, for example, relates to physical layer parameters such as frequency, scrambling code, etc.

In some embodiments, the measurement reports that do not contain routing parameters use existing measurement report message formats (meaning that the identification at least fits within existing physical layer parameter space in these messages, or such that including a report for a CSG cell does not require any more space than would be required to report a non-CSG cell, whether the non-CSG cell operates using the same or different radio access technology as the CSG cell).

Figure 5:
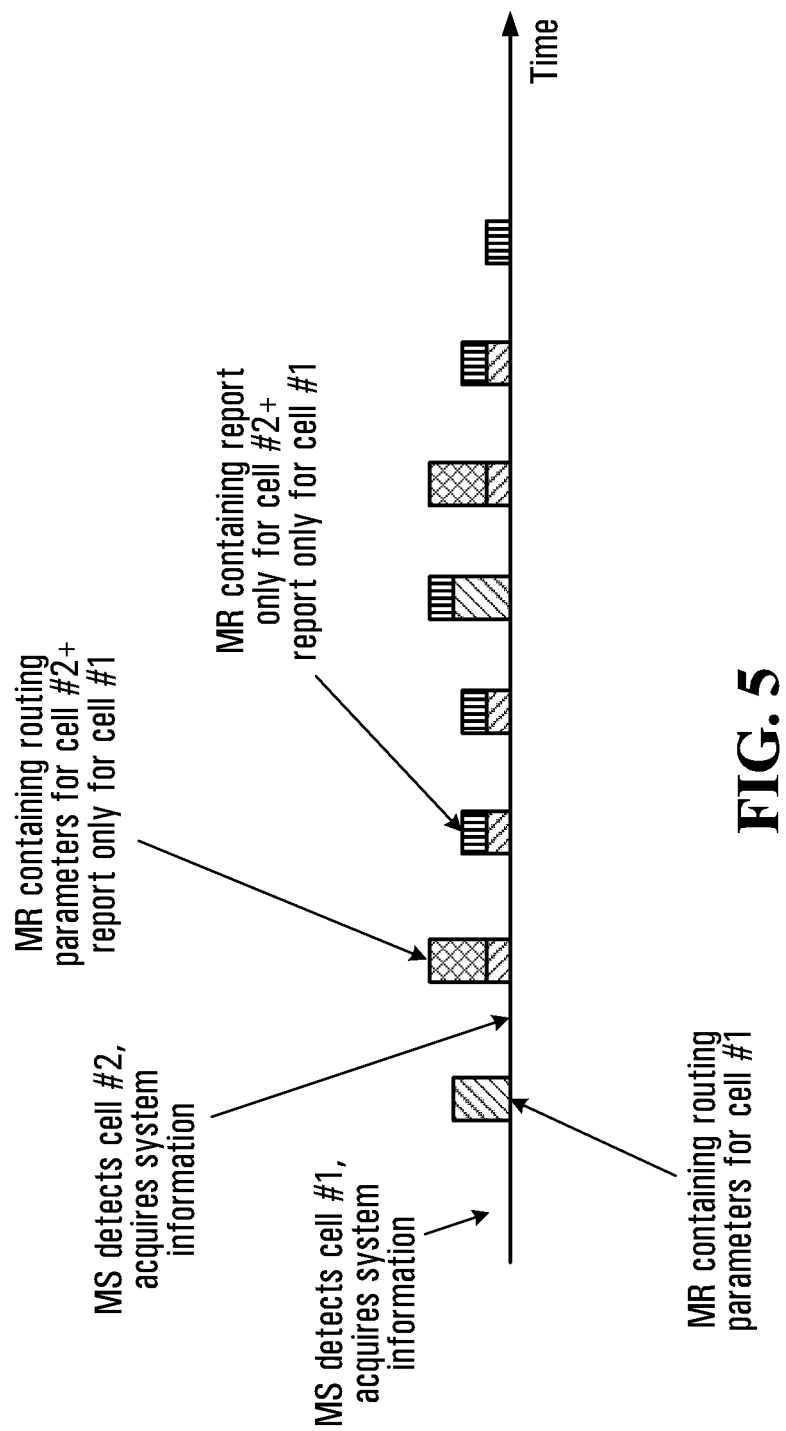
FIG. 5 is an example of a sequence of measurement reports that include reports for two cells.

In some embodiments, a measurement report including routing parameters for one CSG cell can accommodate another measurement report that does not contain routing parameters for another CSG cell, such that concurrent reporting of two CSG cells is possible. An example of this is depicted in FIG. 5, where the same reporting sequence as was depicted in FIG. 4 is used for each cell, namely a first report containing routing parameters, three reports that do not contain routing parameters, another report that contains routing parameters, and two more reports that do not contain routing parameters for a total of 7 measurement reports. The sequence of events depicted in FIG. 5 is as follows:

a) the mobile station detects cell#1 and acquires system information;

b) the mobile station transmits a measurement report containing routing parameters for cell#1;

c) the mobile station detects cell#2 and acquires system information;

d) the mobile station transmits a measurement report containing routing parameters for cell#2, and report only (i.e. no routing parameters) for cell#1;

e) the mobile station transmits a measurement report containing report only (i.e. no routing parameters) for cell#1 and cell#2;

f) the mobile station transmits another measurement report containing report only (i.e. no routing parameters) for cell#1 and cell#2;

g) the mobile station transmits a measurement report containing routing parameters for cell#1, and report only (i.e. no routing parameters) for cell#2;

h) the mobile station transmits a measurement report containing routing parameters for cell#2, and report only (i.e. no routing parameters) for cell#1;

i) the mobile station transmits another measurement report containing report only (i.e. no routing parameters) for cell#1 and cell#2;

j) the mobile station transmits a measurement report containing report only (i.e. no routing parameters) for cell#2.

The following is a detailed example, where N_CSG_REPORTS_MAX is an example of N_max, N_CSG_REPORTS_FULL_MAX is an example of N_RP_max, N_CSG_REPORTS_MIN is an example of N_min.

a) If N_CSG_REPORTS_MAX is signalled by the network then the mobile station shall not transmit a measurement report for the same CSG cell more than N_CSG_REPORTS_MAX times in a defined (e.g. 60 seconds) second period, regardless of the value of the measured quantity/quantities.

b) At least two (or all, if fewer than two are sent), but no more than N_CSG_REPORTS_FULL_MAX measurement reports containing routing parameters shall be sent for the same CSG cell in any defined (e.g. 60 seconds) period.

c) If the mobile station sends a measurement report for a CSG cell, which it has not reported within the last defined period (e.g. 60 seconds), it shall include routing parameters in that report, and send at least a further N_CSG_REPORTS_MIN−1 reports for the same cell (for example within the next defined period, such as 30 seconds) while the cell meets the applicable measurement reporting criteria, the last of which shall include routing parameters.

In some embodiments only a) is implemented. In some embodiments, only b) is implemented In some embodiments, only c) is implemented. In some embodiments, a) and b) are implemented. In some embodiments, a) and c) are implemented. In some embodiments, b) and c) are implemented. In some embodiments, a), b) and c) are implemented.

In some embodiments, N_CSG_REPORTS_MAX and N_CSG_REPORTS_MIN may be the same value.

In some embodiments, N_CSG_REPORTS_MAX, N_CSG_REPORTS_FULL_MAX and N_CSG_REPORTS_MIN are transmitted in broadcast system information (e.g. System Information Type 2 quater and/or in MEASUREMENT INFORMATION messages and/or in PACKET MEASUREMENT ORDER messages).

Figure 6:
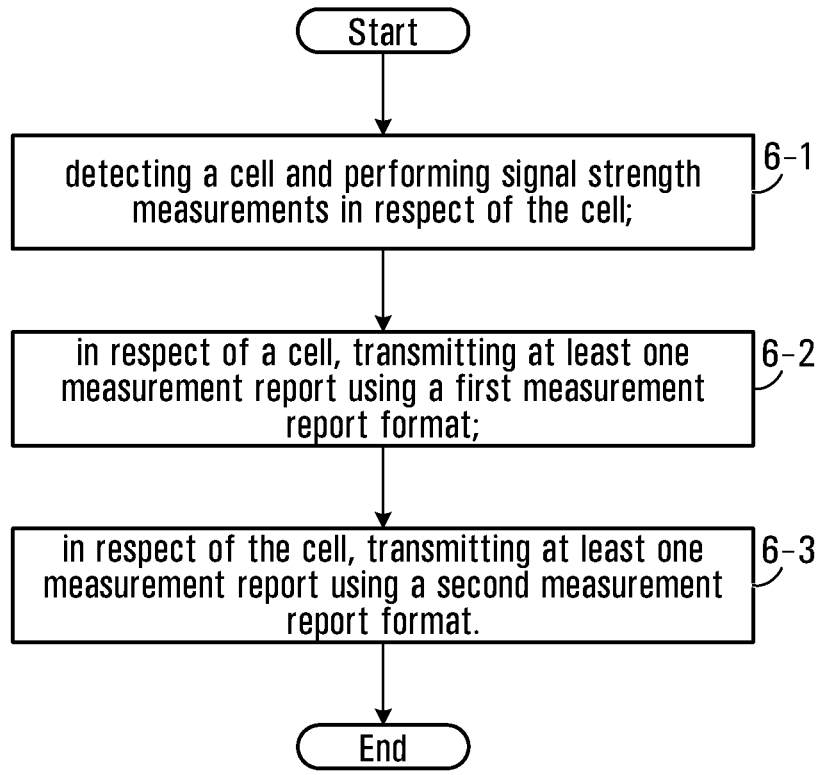
FIG. 6 is a flowchart of another method of generating measurement reports by a mobile station.

Various Options for Transmitting Measurement Reports that do not Contain Routing Parameters Referring now to FIG. 6, shown is a flowchart of a method for execution by a mobile station, such as but not be limited to mobile station 10 of FIG. 1 or mobile station 100 of FIG. 8. In block 6-1, the mobile station detects a cell and performing signal strength measurements in respect of the cell. In block 6-2, in respect of a cell, the mobile station at least one measurement report using a first measurement report format. In block 6-3, in respect of the cell, the mobile station transmits at least one measurement report using a second measurement report format. As indicated previously, in some cases the first measurement report format is one that includes routing parameters, and the second measurement report format is one that does not include routing parameters.

Measurement reports in respect of uncontrolled cells without routing parameters are always sent in the context of other measurement reports that do contain routing parameters. The network can associate the two types of reports to the same cell. Because of this, it is not necessary that an index (such as a frequency index) or other identifier used for the measurement reports that do not contain routing parameters be known in advance to the network or the mobile station, nor that it is currently unused.

In some embodiments, the index or other identifier to be used is set by the mobile station when sending a measurement report which includes the routing parameters, and the index or other identifier is included in the measurement report that includes the routing parameters.

In some embodiments, the mobile station is allowed to choose any frequency index (more generally, any index or identifier) (including a GSM frequency index) provided that the bit sequence used to encode the frequency index and PCI/PSC combination is not used for any other neighbour cell.

Figure 7:
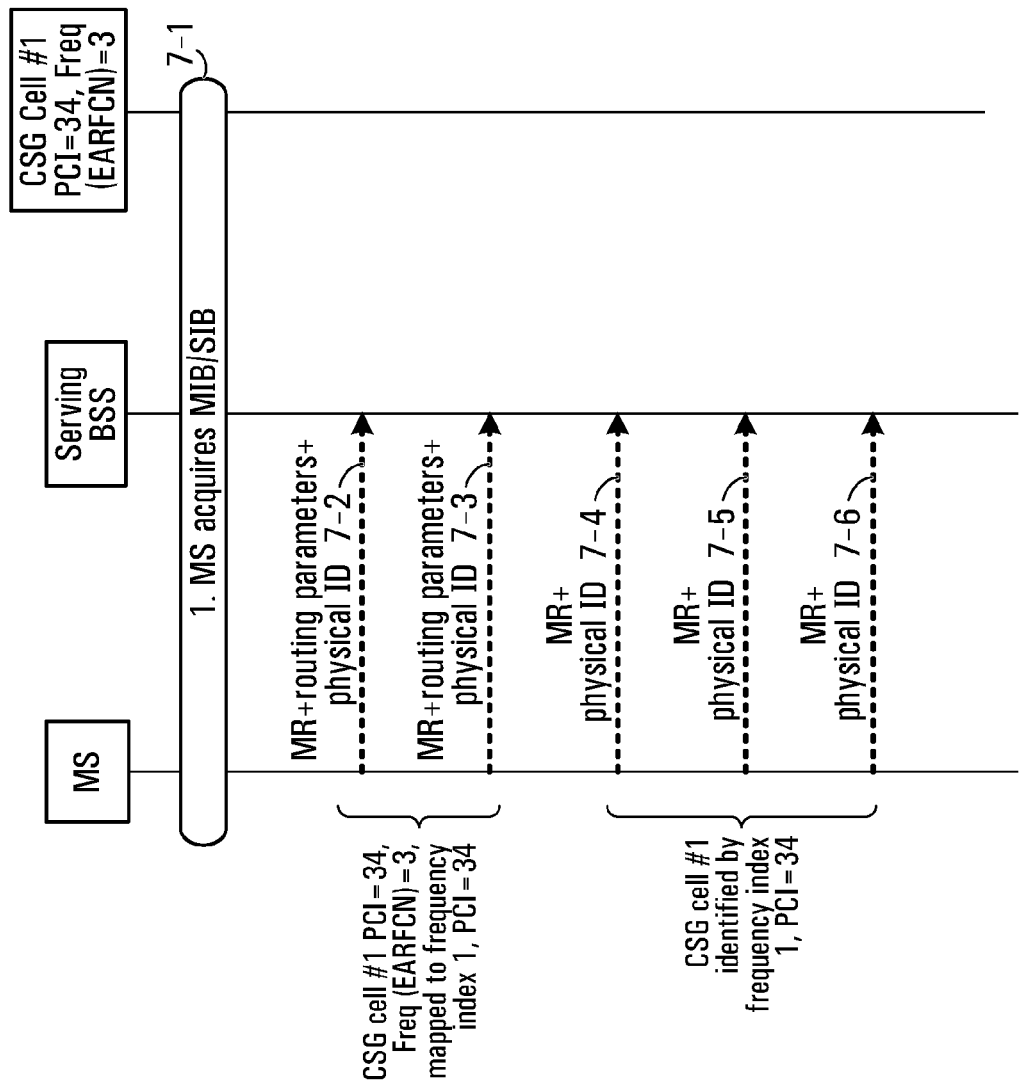
FIG. 7 is an example of a sequence of measurement reports.

An example of this approach will be described with reference to FIG. 7. At 7-1, the mobile station acquires system information etc. in respect of a cell, in this case the cell is CSG cell#1 having PCI=34, and Frequency (EARFCN)=3. The mobile station maps CSG cell#1 having PCI=34, and Frequency (EARFCN)=3 to frequency index 1, PCI=34, having determined that this is not used by any other neighbour cell. At 7-2, the mobile station transmits a measurement report containing routing parameters and the physical layer identifier(s) and/or index or indices to be used to subsequently identify the cell in measurement reports not containing routing parameters, in this case frequency index=1, PCI=34. At 7-3, the mobile station again transmits a measurement report containing routing parameters and these identifiers. At each of 7-4, 7-5, 7-6, the mobile station transmits a respective measurement report that contains the mapped identifying information (frequency index 1, PCI=34) and does not contain routing parameters.

One benefit of using an index of a GSM frequency or UMTS frequency is that it minimizes confusion, since a) there are no GSM CSG cells, and b) GSM and UMTS neighbour (non-CSG) cells are explicitly listed in neighbour cell lists, whereas E-UTRAN cells are not; there may therefore be a macro (non-CSG) E-UTRAN cell with the same PCI/frequency in the vicinity, possibly unknown to the MS but known to the network.

In some embodiments, it is specified that the index must belong to a reduced set of indices. Advantageously, this will reduce the amount of signalling required to specify the index in the measurement report containing routing parameters. For example, the index might be specified to come from the first 4/8/16 frequency indices (noting that GSM frequencies start at zero and work up; while E-UTRAN/UTRAN frequencies start at 31 and work backwards, so making it most likely that a GSM index was used), then only 2/3/4 bits (respectively) would be needed when signalling the mapping in the full report (containing routing parameters).

A further benefit of this approach is that, should PCI/PSC (physical layer cell identifier/primary scrambling code) confusion be detected by the MS (i.e. two CSG cells operating using the same physical layer parameters), the mobile station can use different identifiers for the two cells (even though they are using the same physical parameters), thereby allowing a distinction in messages which do not contain the routing parameters. Explicitly mapping to a particular index can be used even when the physical frequency does have a corresponding index (e.g. because it is also used by non-CSG cells) to allow concurrent reporting of cells which use identical physical layer parameters.

In some embodiments where the mobile station transmits measurement reports using a defined sequence of reports that do and do not contain routing parameters, the mapping is considered to be valid by the mobile station within a given "sequence" (i.e. for up to N_max reports). Correspondingly, the mapping should be considered by the network to be valid only for (at most) N_max measurement reports after first being used in a report containing routing parameters. However, if sequence numbers or other "position-in-sequence" indicators are used, the network may be able to delete the mapping more accurately e.g. in cases where the first report was lost/mis-decoded.

In general, in some embodiments, the mobile station selects a means to identify a CSG cell by means of parameters normally used to identify cells in existing measurement report messages (such as frequency indices, indices to a neighbour cell list, base station identity code (BSIC), cell identity), sending measurement reports in a second format omitting routing parameters but identifying the cell by means of these parameters. In some embodiments, the selected parameters do not correspond to or could not be mistaken for a controlled (e.g. non-CSG) cell. In some embodiments, the mobile station additionally (and in some cases, first) signals some part or all of the selected parameters together with routing parameters in a first measurement report format. In some other embodiments, the selected parameters are not sent together with the routing parameters, in particular, if the selected parameters are such that either there is no ambiguity as to the identity of the cell when these are used in the second measurement report format or there is no ambiguity as to the fact that the reported cell is a CSG cell. The selected parameters may be those applicable to a cell using the same radio access technology or a different radio access technology as the CSG cell.

Using Unused Frequency Index

An alternative approach is to use an (otherwise) unused frequency index (more generally, index or identifier) which can be determined by both the MS and network in advance. In a specific example, the unused frequency index is the lowest index not otherwise used. This can then be used for all subsequent "report-only" reporting of CSG cells, without needing to be explicitly identified in the full report with routing parameters (thereby saving some space compared to the previous examples). Where the mobile station only reports on one CSG cell at a time, the network will be able to associate such reports with the cell identified in the measurement report containing routing parameters notwithstanding the absence of an explicit mapping between the two. A disadvantage of this is that if PCI/PSC confusion is observed, there is no way for the MS to indicate this to the network without reporting full routing parameters for the cell.

In some embodiments, at least two indices are used to distinguish UTRAN/E-UTRAN CSG cells. More generally, in some embodiments, a respective index is used for each of a respective class of uncontrolled cells.

Another specific example of measurement reports for a CSG cell which do not include routing parameters involves identification of the CSG cell by the BSIC-NCELL parameter and the frequency index (BCCH-FREQ-NCELL) values (in the case of a MEASUREMENT REPORT). The mobile station indicates the value of these parameters used to identify the cell in the measurement report(s) containing routing parameters for that cell.

Another specific example of measurement reports for a CSG cell which do not include routing parameters involves identification of the CSG cell by a neighbour cell list index (see sub-clause 3.4.1.2.1.3) (if Enhanced Measurement Reporting is used, including for PACKET ENHANCED MEASUREMENT REPORT, see 3GPP TS 44.060). The mobile station indicates the value of these parameters used to identify the cell in the measurement report(s) containing routing parameters for that cell.

Another specific example of measurement reports for a CSG cell which do not include routing parameters involves identification of the CSG cell by a FREQUENCY_N and BSIC_N (for PACKET MEASUREMENT REPORT messages, see 3GPP TS 44.060). The mobile station indicates the value of these parameters used to identify the cell in the measurement report(s) containing routing parameters for that cell.

The mobile station may concurrently report on two cells which use the same physical layer identifiers by indicating different parameters for each. In general, the mobile station is responsible for ensuring that selected values would not result in any ambiguity (in other words, the combination should not correspond to a neighbour cell in the GSM or 3G neighbour cell list).

In some embodiments that impose a minimum constraint on the number of measurement reports to send, the network may estimate mobility of the device (and hence, for example, whether the device is likely to shortly move out of coverage of the cell).

In some embodiments in which routing parameters are sent at least twice, this may minimize/reduce the possibility that the network wishes to trigger a handover but has not received routing parameters.

In some embodiments, the network (assuming it received the routing parameters the first time) will be able to trigger handover before all measurement reports have been sent.

Some embodiments may avoid the mobile station repeatedly sending measurement reports for a cell for which no handover is going to occur.

Some embodiments allow for a tradeoff between routing parameter transmission reliability and the possibility to report (and hence enable handover to) other cells simultaneously.

Referring now to FIG. 8, shown is a block diagram of another mobile station 100 that is configured to perform one or a combination of the mobile station implemented methods described in this disclosure. The mobile station 100 is shown with a measurement report generator 101 for implementing features similar to those of the measurement report generator 24 of the mobile station 10 of FIG. 1. It is to be understood that the mobile station 100 is shown with very specific details for exemplary purposes only.

A processing device (a microprocessor 128) is shown schematically as coupled between a keyboard 114 and a display 126. The microprocessor 128 controls operation of the display 126, as well as overall operation of the mobile station 100, in response to actuation of keys on the keyboard 114 by a user.

The mobile station 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile station 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile station 100 may have a battery 121 to power the active elements of the mobile station 100. The mobile station 100 is in some embodiments a two-way radio frequency (RF) communication device having voice and data communication capabilities. In addition, the mobile station 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile station 100 may also be stored to the RAM 118.

The microprocessor 128, in addition to its operating system functions, enables execution of software applications on the mobile station 100. A predetermined set of software applications that control basic device operations, such as a voice communications module 130A and a data communications module 1308, may be installed on the mobile station 100 during manufacture. In addition, a personal information manager (PIM) application module 130C may also be installed on the mobile station 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The specific design and implementation of the communication subsystem 170 is dependent upon the communication network in which the mobile station 100 is intended to operate. For example, the communication subsystem 170 of the mobile station 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, and/or an 802.16 WiMAX network. Other types of data and voice networks, both separate and integrated, may also be utilized with the mobile station 100.

Network access may vary depending upon the type of communication system. For example, in the Mobitex™ and DataTAC™ networks, mobile stations are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile station 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile station 100. In addition, the display 126 may also be utilized in voice communication mode, for example, to display the identity of a calling party, the duration of a voice call, or other voice call related information.

The short-range communications subsystem 102 enables communication between the mobile station 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Also, note that a mobile station might be capable of operating in multiple modes such that it can engage in both CS (Circuit-Switched) as well as PS (Packet-Switched) communications, and can transit from one mode of communications to another mode of communications without loss of continuity. Other implementations are possible.

For completeness, reference is made to the following two documents:

3GPP TS 44.060 v.9.3.0 "General Packet Radio Service (GPRS); Mobile Station (MS)—Base Station System (BSS) interface; Radio Link Control/Medium Access Control (RLC/MAC) protocol (Release 9)"

3GPP TS 44.018 v.9.4.0 "Mobile radio interface layer 3 specification; Radio Resource Control (RRC) protocol (Release 9)"

Both of these references are available at www.3gpp.org/ftp/Specs/2010-03/Rel-9/44 series/.

Four sections from the above two documents are reproduced below.

From 44.018:

9.1.55 is the Enhanced Measurement Report message.

10.5.2.20 is the information element containing measurement reports that is included in the Measurement Report message.

9.1.55 Enhanced Measurement Report

This message containing measurement results is sent on the SACCH by the mobile to the network. See below.

This message may contain reports on GSM and/or 3G Radio Access Technologies. Measurements are defined in 3GPP TS 45.008.

Message type: ENHANCED MEASUREMENT REPORT
Significance: dual
Direction: mobile station to network

```
<Enhanced Measurement report> ::=
        < RR short PD : bit >                                                          -- See
3GPP TS 24.007
        < Message type : bit (5) >                                                     -- See 10.4
        < Short layer 2 header : bit (2) >                                             -- See 3GPP TS 44.006
        < BA_USED : bit >
        < 3G_BA_USED : bit >
        < BSIC_Seen : bit >
        < SCALE : bit >
        { 0 | 1 < Serving cell data : < Serving cell data struct >> }
        { 1 < Repeated Invalid_BSIC_Information : < Repeated Invalid_BSIC_Information
struct >> } ** 0
        { 0 | 1 { 0 | 1 < REPORTING_QUANTITY : bit (6) > } **
}                                                       -- bitmap type reporting
        { null | L bit ** = < no string >               -- Receiver compatible with earlier release
        |
H                                                                                      --
Additions in Rel-8 :
                < BITMAP_LENGTH : bit(7) >
                { 0 | 1 < REPORTING_QUANTITY : bit (6) > } * (val(BITMAP_LENGTH + 1 )
)
                { 0 | 1 < E-UTRAN Measurement Report : < E-UTRAN Measurement
Report struct >> }
        < spare padding > } ;
< Serving cell data struct > ::=
        < DTX_USED : bit >
        < RXLEV_VAL : bit (6) >
        < RX_QUAL_FULL : bit (3) >
        < MEAN_BEP : bit (5) >
        < CV_BEP : bit (3) >
        < NBR_RCVD_BLOCKS : bit (5) > ;
< Repeated Invalid_BSIC_Information struct > ::=
        < BCCH-FREQ-NCELL : bit (5) >
        < BSIC : bit (6) >
        < RXLEV-NCELL : bit (6) > ;
< E-UTRAN Measurement Report struct > ::=
        < N_E-UTRAN: bit (2) >
        {       < E-UTRAN_FREQUENCY_INDEX : bit (3) >
                < CELL IDENTITY : bit (9) >
                < REPORTING_QUANTITY : bit (6) > } * (val(N_E-UTRAN + 1 )) ;
```

Enhanced Measurement Report Message Content

TABLE 9.1.55.1

Enhanced Measurement Report information element details.

BA_USED (1 bit field),
The value of the BA-IND field of the neighbour cell description information element or elements defining the BCCH allocation used. Range 0 to 1.

TABLE 9.1.55.1-continued

Enhanced Measurement Report information element details.

3G_BA_USED (1 bit field)
The value of the 3G-BA-IND field of the neighbour cell description information
element or elements defining the 3G and/or E-UTRAN allocation used. Range 0
to 1..
BSIC_Seen (1 bit field)
This parameters indicates if a GSM cell with invalid BSIC and allowed NCC part
of BSIC is one of the six strongest, see 3GPP TS 45.008.
Bit
0    No cell with invalid BSIC and allowed NCC part of BSIC is seen
1    One Cell or more with invalid BSIC and allowed NCC part of BSIC is seen
SCALE (1 bit field)
The value of this field is defined in 3GPP TS 45.008.
Serving cell reporting
If this structure is missing, this indicates that no valid measurement exist for the
serving cell.
Parameters RXLEV_VAL (6 bits), RX_QUAL_FULL (3 bits), MEAN_BEP (5
bits), CV_BEP (3 bits), NBR_RCVD_BLOCKS (5 bits) are defined in
3GPP TS 45.008.
DTX_USED (1 bit field)
This bit indicates whether or not the mobile station used DTX during the previous
measurement period.
0    DTX was not used
1    DTX was used.
Neighbour cell reporting
Repeated Invalid BSIC
This structure contains the report of cells with invalid BSIC.
BCCH-FREQ-NCELL (5 bits). This field represents the index of the BA (list), see
10.5.2.20.
BSIC (6 bits). Base station identity code of the corresponding index in the BA
(list).
RXLEV (6 bits). GSM reporting quantity, see 3GPP TS 45.008.
Bitmap type reporting:
This structure contains the report of cells with valid BSIC.
Each bit of the bitmap points to the corresponding index of the Neighbour Cell list
defined in sub-clause 3.4.1.2.1.3 'Deriving the Neighbour Cell list from the GSM
Neighbour Cell list and the 3G Neighbour Cell list'.
If this structure is present and more bits than needed are available at the end of
the message, the MS shall set the value of the redundant bitmap positions to '0'.
At least 96 neighour cell entries shall be encoded in the bitmap.
If this structure is present, some remaining bits indicating no report at the end of
the message may be omitted if these bits do not fit into the message. This shall
not lead to an error in the receiver of that message.
If E-UTRAN neighbour cells are to be reported, then this structure shall be
omitted and replaced by the bitmap reporting structure in the release-8 extension
of this message.
REPORTING_QUANTITY (6 bits):
Measurement quantities are defined in 3GPP TS 45.008.
E-UTRAN Neighbour cell reporting
BITMAP_LENGTH (7 bit field)
1 + val(BITMAP_LENGTH) indicates the number of entries in the reporting bitmap.
Bitmap type reporting:
This structure contains the report of cells with valid BSIC.
Each bit of the bitmap points to the corresponding index of the Neighbour Cell list
defined in sub-clause 5.6.3.3 ("Deriving the Neighbour Cell list from the GSM
Neighbour Cell list and the 3G Neighbour Cell list").
REPORTING_QUANTITY (6 bits):
Measurement quantities are defined in 3GPP TS 45.008.
E-UTRAN Measurements
Measurement reporting for E-UTRAN Cells is defined in 3GPP TS 45.008.
E-UTRAN_FREQUENCY_INDEX (3 bit field)
This field contains the index of the frequency of the cell for which the
measurement is reported. This field is defined in sub-clause 9.1.54.
CELL_IDENTITY (9 bit field)
This field contains the physical layer cell identity (as defined in 3GPP TS 36.211)
of the cell being reported.
REPORTING_QUANTITY (6 bit field)
This is the reporting quantity for the E-UTRAN cell identified by the E-UTRAN
frequency and physical layer cell identity. The quantities are defined in
3GPP TS 45.008 for the respective Radio Access Technology.

10.5.2.20 Measurement Results

The purpose of the Measurement Results information element is to provide the results of the measurements made by the mobile station on the serving cell and the neighbour cells.

The Measurement Results information element is coded as shown below and table 10.5.2.20.1.

The Measurement Results is a type 3 information element with 17 octets length.

| 8 | 7 | 6 | 5 | 4 | 3 | 2 | 1 | |
|---|---|---|---|---|---|---|---|---|
| Measurement Results IEI ||||||||  octet 1 |
| BA-USED | DTX USED | RXLEV-FULL-SERVING-CELL ||||||  octet 2 |
| 3G-BA-USED | MEAS-VALID | RXLEV-SUB-SERVING-CELL ||||||  octet 3 |
| Spare | RXQUAL-FULL SERVING-CELL ||| RXQUAL-SUB SERVING-CELL ||| NO-CELL M (high part) | octet 4 |
| NO-NCELL-M (low part) ||| RXLEV-NCELL 1 |||||  octet 5 |
| BCCH-FREQ-NCELL 1 ||||| BSIC-NCELL 1 (high part) |||  octet 6 |
| BSIC-NCELL 1 (low part) ||| RXLEV-NCELL 2 (high part) |||||  octet 7 |
| RXLEV NCELL 2 (low part) | BCCH-FREQ-NCELL 2 |||| BSIC-NCELL 2 (high part) |||  octet 8 |
| BSIC-NCELL 2 (low part) ||| RXLEV-NCELL 3 (high part) |||||  octet 9 |
| RXLEV-NCELL 3 (low part) ||| BCCH-FREQ-NCELL 3 |||| BSIC-NCELL 3 (high part) | octet 10 |
| BSIC-NCELL 3 (low part) |||| RXLEV-NCELL 4 (high part) ||||  octet 11 |
| RXLEV-NCELL 4 (low part) |||| BCCH-FREQ-NCELL 4 ||||  octet 12 |
| BSIC-NCELL 4 |||| RXLEV-NCELL 5 (high part) ||||  octet 13 |
| RXLEV-NCELL 5 (low part) |||| BCCH-FREQ-NCELL 5 (high part) ||||  octet 14 |
| BCCH-FREQ-NCELL 5 (low part) | BSIC-NCELL 5 |||||| RXLEV NCELL 6 (high part) | octet 15 |
| RXLEV-NCELL 6 (low part) |||| BCCH-FREQ-NCELL 6 (high part) ||||  octet 16 |
| BCCH-FREQ-NCELL 6 (low part) ||| BSIC-NCELL 6 |||||  octet 17 |

Measurement Results Information Element

TABLE 10.5.2.20.1

Measurement Results information element details

BA-USED (octet 2), the value of the BA_IND field of the neighbour cell description information element or elements defining the BCCH allocation used for the coding of BCCH-FREQ-NCELL fields. Range 0 to 1.
DTX-USED (octet 2) This bit indicates whether or not the mobile station used DTX during the previous measurement period.
Bit 7
0   DTX was not used
1   DTX was used
RXLEV-FULL-SERVING-CELL and RXLEV-SUB-SERVING-CELL, (octets 2 and 3) Received signal strength on serving cell, measured respectively on all slots and on a subset of slots (see 3GPP TS 45.008)
The RXLEV-FULL-SERVING-CELL and RXLEV-SUB-SERVING-CELL fields are coded as the binary representation of a value N. N corresponds according to the mapping defined in 3GPP TS 45.008 to the received signal strength on the serving cell.
Range: 0 to 63
MEAS-VALID (octet 3)
This bit indicates if the measurement results for the dedicated channel are valid or not
Bit 7
0   The measurement results are valid
1   the measurement results are not valid
3G-BA-USED (octet 3)
The value of the 3G_BA_IND field of the neighbour cell description information element or elements defining the 3G Neighbour Cell list used for the coding of 3G BCCH-FREQ-NCELL fields and/or for defining the E-UTRAN Neighbour Cell list. Range 0 to 1.
RXQUAL-FULL-SERVING-CELL and RXQUAL-SUB-SERVING-CELL (octet 4) Received signal quality on serving cell, measured respectively on all slots and on a subset of the slots (see 3GPP TS 45.008)
CELL fields are coded as the binary representation of the received signal quality on the serving cell.
Range: 0 to 7 (See 3GPP TS 45.008)
NO-NCELL-M, Number of neighbour cell measurements (octets 4 and 5)
Bits
1 8 7  Neighbour cell measurement result
0 0 0  None
0 0 1  1
0 1 0  2
0 1 1  3
1 0 0  4
1 0 1  5

TABLE 10.5.2.20.1-continued

Measurement Results information element details 1 1 0    6
1 1 1    Neighbour cell information not available for serving cell
RXLEV-NCELL i, Result of measurement on the i'th neighbour cell (octet 5, 7, 8,
9, 10, 11, 12, 13, 14, 15 and 16)
If the i'th neighbour cell is a GSM cell, the RXLEV-NCELL field is coded as the
binary representation of a value N. N corresponds according to the mapping
defined in 3GPP TS 45.008 to the received signal strength on the i'th neighbouring
cell. See note 1 & 2.
If the i'th neighbour cell is a 3G cell, the contents of the RXLEV-NCELL field is
defined in 3GPP TS 45.008.
Range: 0 to 63.
Report on GSM cells:
BCCH-FREQ-NCELL i, BCCH carrier of the i'th neighbour cell (octet 6, 8, 10, 12,
14, 15, 16 and 17).
The BCCH-FREQ-NCELL i field is coded as the binary representation of the
position, starting with 0, of the i'th neighbour cells BCCH carrier in the BCCH
channel list. The BCCH channel list is composed of one or two BCCH channel sub
lists, each sub list is derived from the set of frequencies defined by reference
neighbour cell description information element or elements. In the latter case the
set is the union of the two sets defined by the two neighbour cell description
information elements.
In each BCCH channel sub list the absolute RF channel numbers are placed in
increasing order of ARFCN, except that ARFCN 0, if included in the set, is put in
the last position in the sub list. The BCCH channel list consists either of only the
sub list derived from the neighbour cell description information element(s) in
System Information 2/5 (and possible 2bis/5bis) or of that sub list immediately
followed by the sub list derived from the neighbour cell description information
element in System Information 2ter/5ter for the case System Information 2ter/5ter
is also received. If the set of ARFCNs defined by the reference neighbour cell
description information element or elements includes frequencies that the mobile
station does not support then these ARFCNs shall be included in the list.
The notation 2/5 etc. means that the rules above apply to the neighbour cell
description information elements received in System Information 2, 2bis and 2ter
and to those received in System Information 5, 5bis and 5ter separately.
See note 1 & 2.
Range: 0 to 31/30.
Report on 3G cells:
If no more than 31 (GSM) ARFCN frequencies are included in the BA (list), the
index BCCH-FREQ-NCELL 31 indicates report(s) on 3G cells.
In this case, the corresponding 'BSIC-NCELL' field in FIG. 10.5.2.20.1 carries the
index of the i'th 3G neighbour cell in the 3G Neighbour Cell list defined in sub-
clause 3.4.1.2.1.1, "Deriving the 3G Neighbour Cell list from the 3G Neighbour
Cell Description". 3G cells with indexes above 63 are not reported (6 bits field).
If more than 31 (GSM) ARFCN frequencies are included in the BA (list), reporting
of 3G cells is not possible with this IE.
Range: 0 to 63.
Report on E-UTRAN cells:
If no more than (31 − NUM_E-UTRAN_FREQUENCIES) GSM ARFCN frequencies
are included in the BA (list), the BCCH-FREQ-NCELL indices from (31 − NUM_E-
UTRAN_FREQUENCIES) to 30 (inclusive) indicate report(s) on E-UTRAN cells.
The index BCCH-FREQ-NCELL 30 indicates a report of an E-UTRAN neighbour
cell on the first frequency defined in the E-UTRAN Neighbour Cell list, the value 29
indicates a report of an E-UTRAN neighbour cell on the second frequency in the
E-UTRAN Neighbour Cell list and so on.
NUM_E-UTRAN_FREQUENCIES is defined as the number of separate E-UTRAN
frequencies in the E-UTRAN Neighbour Cell list.
If the BCCH-FREQ-NCELL index indicates an E-UTRAN frequency, the
corresponding 'BSIC-NCELL' field in FIG. 10.5.2.20.1 contains the least
significant 6 bits of the physical layer cell identity (see 3GPP TS 36.211) of the E-
UTRAN neighbour cell. The corresponding 'RXLEV-NCELL' field in
FIG. 10.5.2.20.1 contains the 3 bit measurement value (see 3GPP TS 45.008) in
the most significant 3 bits of the field and the most significant 3 bits of the physical
layer cell identity in the least significant 3 bits of the field.
If more than (31 − NUM_E-UTRAN_FREQUENCIES) GSM ARFCN frequencies
are included in the BA (list), reporting of E-UTRAN cells is not possible with this IE.
BSIC-NCELL i, Base station identity code of the i'th neighbour cell (octet 6, 7, 8,
9, 10, 11, 13, 15 and 17)
For GSM cells, the BSIC-NCELL i field is coded as the binary representation of the
base station identity code of the i'th neighbour cell. See note 1 & 2.
Range: 0 to 63.

NOTE 1:
If the field extends over two octets the highest numbered bit of the lowest numbered octet is the most significant and the lowest numbered bit of the highest numbered octet is the least significant.
NOTE 2:
If NO-NCELL-M < 6 the remaining RXLEV-NCELL i, BS-FREQ-NCELL i and BSIC-NCELL i fields (NO-NCELL-M < i <= 6) shall be coded with a "0" in each bit.

From 44.060
11.2.9 is the Packet Measurement Report
11.2.9d is the Packet Enhanced Measurement Report
11.2.9 Packet Measurement Report
This message is sent on the PACCH from the mobile station to the network to report measurement results. The message contains measurement results from the Network Control measurements. For a (3G) multi-RAT mobile station, report on 3G cells may be included. For a (E-UTRAN) multi-RAT mobile station, report on E-UTRAN cells may be included.

Message type: PACKET MEASUREMENT REPORT
Direction: mobile station to network

TABLE 11.2.9.1

PACKET MEASUREMENT REPORT message content

< Packet Measurement Report message content > ::=
    < TLLI / G-RNTI : bit (32) >
    { 0 | 1 < PSI5_CHANGE_MARK : bit (2) > }
    0 < NC Measurement Report : < NC Measurement Report struct > >
        { null | 0 bit** = < no string >        -- Receiver compatible with earlier release
        | 1
-- Additions in release 99 :
    { 0 | 1 { 0 < BA_USED : bit > < 3G_BA_USED : bit > | 1 < PSI3_CHANGE_MARK : bit(2) > }
        < PMO_USED : bit > }
    { 0 | 1 < 3G Measurement Report : <    3G Measurement Report struct > > }
    { null | 0 bit ** = < no string >    -- Receiver compatible with earlier release
    |
    1    --
Additions in Rel-5 :
    { 0 | 1 < G-RNTI extension : bit (4) > }
    { null | 0 bit ** = < no string >    -- Receiver compatible with earlier release
    |
    1    --
Additions in Rel-8 :
    { 0 | 1 < E-UTRAN Measurement Report : < E-UTRAN Measurement Report struct > > }
    < padding bits > } } } ;
< NC Measurement Report struct > ::=
    < NC_MODE : bit (1) >
    < RXLEV_SERVING_CELL : bit (6) >
    0    -- The value '1' was allocated in an earlier version of the protocol and shall not be used.
    < NUMBER_OF_NC_MEASUREMENTS : bit (3) >
    {    < FREQUENCY_N : bit (6) >
        { 0 | 1 < BSIC_N : bit (6) > }
        < RXLEV_N : bit (6) > } * (val(NUMBER_OF_NC_MEASUREMENTS)) ;
< 3G Measurement Report struct > ::=
    < N_3G: bit (3) >
    {    < 3G_CELL_LIST_INDEX : bit (7) >
        < REPORTING_QUANTITY : bit (6) > } * (val(N_3G + 1 )) ;
< E-UTRAN Measurement Report struct > ::=
    < N_E-UTRAN: bit (2) >
    {    < E-UTRAN_FREQUENCY_INDEX : bit (3) >
        < CELL IDENTITY : bit (9) >
        < REPORTING_QUANTITY : bit (6) > } * (val(N_E-UTRAN + 1 )) ;

TABLE 11.2.9.2

PACKET MEASUREMENT REPORT information element details

TLLI/G-RNTI (32 bit field)
This field contains the TLLI/G-RNTI of the mobile station. This field is encoded as defined in sub-clause 12.16.
PSI5_CHANGE_MARK (2 bit field)
This field shall contain the value of the PSI5_CHANGE_MARK in the PSI5 message containing the list of frequencies to measure. If the measurement order has been initiated by a PACKET MEASUREMENT ORDER message, the PSI5_CHANGE_MARK parameter shall be omitted from the message.
BA_USED (1 bit field)
3G_BA_USED (1 bit field)
PSI3_CHANGE_MARK (2 bit field)
In case of NC measurement report, these fields shall be included and contain the value of the BA_IND, 3G_BA_IND and PSI3_CHANGE_MARK respectively in the messages defining the used Neighbour Cell list and E-UTRAN Neighbour Cell list.
In case PBCCH exists, PSI3_CHANGE_MARK shall be used.
In case PBCCH does not exist, BA_USED and 3G_BA_USED shall be used.
PMO_USED (1 bit field)

TABLE 11.2.9.2-continued

PACKET MEASUREMENT REPORT information element details

This parameter shall contain the value of the PMO_IND in the PACKET CELL
CHANGE ORDER or PACKET MEASUREMENT ORDER messages that has
modified the used Neighbour Cell list. If no such message has been received,
PMO_USED shall be set to zero.
NC_MODE (1 bit field)
This field indicates if the mobile station was in mode NC1 or NC2 when sending
the measurement report.
0        Mobile station in mode NC1
1        Mobile station in mode NC2
RXLEV_SERVING_CELL (6 bit field)
This field contains the value of the RXLEV parameter for the serving cell
calculated by the mobile station (see 3GPP TS 45.008). This field is encoded as
the binary representation of the RXLEV parameter value defined in
3GPP TS 45.008.
Range 0 to 63
FREQUENCY_N (6 bit field)
This field indicates the frequency/cell upon which the measurement was made.
The field is an index into the resulting Frequency/Cell List for NCmeasurements.
NC Measurements
If PBCCH is allocated in the cell, the resulting frequency/cell list for NC
Measurements is the GSM Neighbour Cell list defined in sub-clause 5.6.3.2.
If PBCCH is not allocated in the cell, the resulting frequency/cell list for NC
Measurements is
    The BA(GPRS) (defined in sub-clause 5.6.3.2) before the MS has acquired the complete
    GSM Neighbour Cell list from the BCCH messages. In this case, the MS shall not include
    R99 extension ('Additions in release 99') in the PACKET MEASUREMENT REPORT
    message.
    The GSM Neighbour Cell list (defined in sub-clause 5.6.3.2) after the MS has acquired the
    complete GSM Neighbour Cell list from the BCCH messages. When the mobile station has
    acquired the GSM Neighbour Cell list, the mobile station shall include in the measurement
    reports only cells present in that list.
BSIC_N (6 bit field)
This field indicates the BSIC of the frequency upon which the measurement was
made. This field shall be included only for frequencies that refer to the
BA(BCCH) list. The field is encoded as the BSIC value defined in
3GPP TS 44.018.
Range 0 to 63
RXLEV_N (6 bit field)
This field indicates the measured RXLEV of the frequency upon which the
measurement was made (see 3GPP TS 45.008). This field is encoded as the
RXLEV value defined in 3GPP TS 44.018.
Range 0 to 63
3G Measurements
Measurement reporting for 3G Cells is defined in 3GPP TS 45.008.
3G_CELL_LIST_INDEX (7 bit field)
This is the index of the i'th reported 3G neighbour cell in the 3G Neighbour Cell
List. See sub-clause 5.6.3.1.
REPORTING_QUANTITY (6 bit field)
This is the reporting quantity for the i'th reported 3G cell. The quantities are
defined in 3GPP TS 45.008 for the respective Radio Access Technology.
G-RNTI extension (4 bit field)
This field contains the extra 4 bits of the G-RNTI not included in the TLLI/G-
RNTI field which are necessary to provide a unique identifier in Iu mode.
E-UTRAN Measurements
Measurement reporting for E-UTRAN Cells is defined in 3GPP TS 45.008.
E-UTRAN_FREQUENCY_INDEX (3 bit field)
This field contains the index into the frequencies specified as part of the E-
UTRAN Neighbour Cell list. This field is described in sub-clause 12.53.
CELL_IDENTITY (9 bit field)
This field contains the physical layer cell identity (as defined in 3GPP TS 36.211)
of the cell being reported.
REPORTING_QUANTITY (6 bit field)
This is the reporting quantity for E-UTRAN cell identified by the E-UTRAN
frequency and physical layer cell identity. The quantities are defined in
3GPP TS 45.008 for the respective Radio Access Technology.

11.2.9d Packet Enhanced Measurement Report

This message is sent either on the PACCH if in packet transfer mode or on an assigned block on a PDTCH, from the mobile station to the network to report enhanced measurement results. The message contains measurement results from the Network Control measurements.

Message type: PACKET ENHANCED MEASUREMENT REPORT

Direction: mobile station to network

TABLE 11.2.9d.1

PACKET ENHANCED MEASUREMENT REPORT message content

```
< PACKET ENHANCED MEASUREMENT REPORT message content > ::=
        < TLLI / G-RNTI : bit (32) >
        { < NC Measurement Report : < NC Measurement Report struct > > }
        { null | 0 bit ** = < no string >      -- Receiver compatible with earlier release
        |                                                                                  --
1
Additions in Rel-5 :
                { 0 | 1 < G-RNTI extension : bit (4) > }
                { null | 0 bit ** = < no string >      -- Receiver compatible with earlier
release
                |                                                                          --
1
Additions in Rel-8 :
                    < BITMAP_LENGTH : bit(7) >
                    { 0 | 1 < REPORTING_QUANTITY : bit (6) > } *
(val(BITMAP_LENGTH + 1 ) )
                    { 0 | 1 < E-UTRAN Measurement Report : < E-UTRAN
Measurement Report struct > > }
                    < padding bits > } } ;
< NC Measurement Report struct > ::=
< NC_MODE : bit (1) >
{ 0 < BA_USED : bit > < 3G_BA_USED : bit >
| 1 < PSI3_CHANGE_MARK : bit(2) > }
< PMO_USED : bit >
< BSIC_Seen : bit >
< SCALE : bit >
{ 0 | 1 < Serving cell data : < Serving cell data struct >> }
{ 1 < Repeated Invalid_BSIC_Information : < Repeated Invalid_BSIC_Information struct >> } **
0
{ 0 | 1 { 0 | 1 < REPORTING_QUANTITY : bit (6) > } ** } ;         --
bitmap type reporting
< Serving cell data struct > ::=
< RXLEV_SERVING_CELL : bit (6) >
0 ;                                         -- The value '1' was allocated in an
earlier version of the protocol and shall not be used.
< Repeated Invalid_BSIC_Information struct > ::=
< BCCH-FREQ-NCELL : bit (5) >
< BSIC : bit (6) >
< RXLEV-NCELL : bit (6) > ;
< E-UTRAN Measurement Report struct > ::=
        < N_E-UTRAN: bit (2) >
        {    < E-UTRAN_FREQUENCY_INDEX : bit (3) >
             < CELL IDENTITY : bit (9) >
             < REPORTING_QUANTITY : bit (6) > } * (val(N_E-UTRAN + 1 )) ;
```

TABLE 11.2.9d.2

PACKET ENHANCED MEASUREMENT REPORT information element details

TLLI/G-RNTI (32 bit field)
This field contains the TLLI/G-RNTI of the mobile station. This field is encoded
as defined in sub-clause 12.16.
NC_MODE (1 bit field)
This field indicates if the mobile station was in mode NC1 or NC2 when sending
the measurement report.
0       Mobile station in mode NC1
1       Mobile station in mode NC2
BA_USED (1 bit field),
3G_BA_USED (1 bit field)
PSI3_CHANGE_MARK (2 bit field)
These fields shall contain the value of the BA_IND, 3G_BA_IND and
PSI3_CHANGE_MARK respectively in the messages defining the used
Neighbour Cell list or E-UTRAN Neighbour Cell list.
In case PBCCH exists, PSI3_CHANGE_MARK shall be used.
In case PBCCH does not exist, BA_USED and 3G_BA_USED shall be used.
PMO_USED (1 bit field)
This parameter shall contain the value of the PMO_IND in the PACKET CELL
CHANGE ORDER or PACKET MEASUREMENT ORDER messages that has
modified the used Neighbour Cell list. If no such message has been received,
PMO_USED shall be set to zero.
BSIC_Seen (1 bit field)
This parameters indicates if a GSM cell with invalid BSIC and allowed NCC part
BSIC is one of the six strongest, see 3GPP TS 45.008.

TABLE 11.2.9d.2-continued

PACKET ENHANCED MEASUREMENT REPORT information element details

Bit
0    No cell with invalid BSIC and allowed NCC part of BSIC is seen
1    One cell or more with invalid BSIC and allowed NCC part of BSIC is seen
SCALE (1 bit field)
The value of this field is defined in 3GPP TS 45.008.
Serving cell reporting
If the structure "serving cell data" is missing, this indicates that no valid
measurement exist for the serving cell.
RXLEV_SERVING_CELL (6 bit field)
This field contains the value of the RXLEV parameter for the serving cell
calculated by the mobile station (see 3GPP TS 45.008). This field is encoded as
the binary representation of the RXLEV parameter value defined in
3GPP TS 45.008.
Range 0 to 63
Neighbour cell reporting
Repeated Invalid BSIC
This structure contains the report of cells with invalid BSIC.
BCCH-FREQ-NCELL (5 bits). This field represents the index of the BA(GPRS),
see 3GPP TS 44.018.
BSIC (6 bits). Base station identity code of the corresponding index in the
BA(GPRS).
RXLEV (6 bits). GSM reporting quantity, see 3GPP TS 45.008.
Bitmap type reporting:
This structure contains the report of cells with valid BSIC.
Each bit of the bitmap points to the corresponding index of the Neighbour Cell
list defined in sub-clause 5.6.3.3 ("Deriving the Neighbour Cell list from the GSM
Neighbour Cell list and the 3G Neighbour Cell list").
If this structure is present and more bits than needed are available at the end of
the message, the MS shall set the value of the redundant bitmap positions to '0'.
At least 96 neighour cell entries shall be encoded in the bitmap.
If this structure is present, some remaining bits indicating no report at the end of
the message may be omitted if these bits do not fit into the message. This shall
not lead to an error in the receiver of that message.
If E-UTRAN neighbour cells are to be reported, then this structure shall be
omitted and replaced by the bitmap reporting structure in the release-8 extension
of this message.
REPORTING_QUANTITY (6 bits):
Measurement quantities are defined in 3GPP TS 45.008.
G-RNTI extension (4 bit field)
This field contains the extra 4 bits of the G-RNTI not included in the TLLI/G-
RNTI field which are necessary to provide a unique identifier in Iu mode.
E-UTRAN Neighbour cell reporting
BITMAP_LENGTH (7 bit field)
1 + val(BITMAP_LENGTH) indicates the number of entries in the reporting
bitmap.
Bitmap type reporting:
This structure contains the report of cells with valid BSIC.
Each bit of the bitmap points to the corresponding index of the Neighbour Cell
list defined in sub-clause 5.6.3.3 ("Deriving the Neighbour Cell list from the GSM
Neighbour Cell list and the 3G Neighbour Cell list").
REPORTING_QUANTITY (6 bits):
Measurement quantities are defined in 3GPP TS 45.008.
E-UTRAN Measurement Report
This information element contains the measurement reports for one or more E-
UTRAN neighbour cell. This field is defined in sub-clause 11.2.9.

In addition, reference is made to GP-100746 CR 44.060-1338 rev 2 "Introduction of inbound mobility to CSG cells", Nokia Siemens Networks, Nokia Corporation, 3GPP TSG GERAN #46, 17-21 May 2010, Jeju, South Korea. This document contains specific examples of measurement reports that contain routing parameters. Two sections are reproduced below.

12.59 E-UTRAN CSG Measurement Report

The E-UTRAN CSG Measurement Report information element contains measurement results for one E-UTRAN CSG neighbour cell identified via its Cell Global Identity.

TABLE 12.59.1

E-UTRAN CSG Measurement Report information element

< E-UTRAN CSG Measurement Report IE > ::=
    { 0 | 1      < E-UTRAN CGI : bit (28) >
                        < Tracking Area Code : bit (16) > }
    { 0      | 1      < PLMN-ID : < PLMN-ID Struct > > }
    { 0      | 1      < CSG-ID : bit (27) > }
    < Access Mode : bit (1) >
    < REPORTING_QUANTITY : bit (6) > ;
< PLMN-ID struct > ::=
    < MCC : bit (12) >
    < MNC : bit (12) > ;

TABLE 12.59.2

E-UTRAN CSG Measurement Report information element details

E-UTRAN CGI (28 bit field)
This field contains the E-UTRAN Global Cell Identity (as defined in
3GPP TS 23.003) of the CSG cell being reported. If the target cell is a hybrid
access mode cell, this field shall not be included.
Tracking Area Code (16 bit field)
This field contains the tracking area code (as defined in 3GPP TS 24.301) of the
CSG cell being reported. If the target cell is a hybrid access mode cell, this field
shall not be included.
PLMN-ID
This information element contains the PLMN-ID of the CSG cell being reported. If
this field is not present then the PLMN-ID of the target CSG cell is the same as
that of the serving cell.
CSG-ID (27 bit field)
This field contains the CSG identity (as defined in 3GPP TS 23.003) of the CSG
cell being reported.
Access Mode (1 bit field)
This field indicates the access mode of the reported cell. It is coded as follows:
0       The reported cell is a closed access mode cell.
1       The reported cell is a hybrid access mode cell.
REPORTING_QUANTITY (6 bit field)
This is the reporting quantity for E-UTRAN CSG cell identified by the E-UTRAN
Global Cell Identity. The quantities are defined in 3GPP TS 45.008 for the
respective Radio Access mode.
PLMN-ID struct
MCC (12 bit field)
This field contains the Mobile Country Code of the PLMN of the cell being
reported.
MNC (12 bit field)
This field contains the Mobile Network Code of the PLMN of the cell being
reported.

12.60 UTRAN CSG Measurement Report

The UTRAN CSG Measurement Report information element contains measurement results for a single UTRAN CSG neighbour cell identified via its Cell Global Identity.

TABLE 12.60.1

UTRAN CSG Measurement Report information element

< UTRAN CSG Measurement Report IE > ::=
    { 0    | 1    < UTRAN CGI : bit (28) > }

TABLE 12.60.1-continued

UTRAN CSG Measurement Report information element

{ 0    | 1    < PLMN-ID : < PLMN-ID Struct > > }
    { 0    | 1    < CSG-ID : bit (27) > }
< Access Mode : bit (1) >
< REPORTING_QUANTITY : bit (6) > ;
< PLMN-ID struct > ::=
    < MCC : bit (12) >
    < MNC : bit (12) > ;

TABLE 12.60.2

UTRAN CSG Measurement Report information element details

UTRAN CGI (28 bit field)
This field contains the Cell Identity (as defined in 3GPP TS 25.331) of the CSG
cell being reported. If the target cell is a hybrid access mode cell, this field shall
not be included.
PLMN-ID
This information element contains the PLMN-ID of the CSG cell being reported. If
this field is not present then the PLMN-ID of the target CSG cell is the same as
that of the serving cell.
CSG-ID (27 bit field)
This field contains the CSG identity (as defined in 3GPP TS 23.003) of the CSG
cell being reported.
Access Mode (1 bit field)
This field indicates the access mode of the reported cell. It is coded as follows:
0       The reported cell is a closed access mode cell.
1       The reported cell is a hybrid access mode cell.
REPORTING_QUANTITY (6 bit field)
This is the reporting quantity for UTRAN CSG cell identified by the UTRAN Global
Cell Identity. The quantities are defined in 3GPP TS 45.008 for the respective
Radio Access mode.
PLMN-ID struct
MCC (12 bit field)
This field contains the Mobile Country Code of the PLMN of the cell being
reported.
MNC (12 bit field)
This field contains the Mobile Network Code of the PLMN of the cell being
reported.

Numerous modifications and variations of the present application are possible in light of the above teachings. It is therefore to be understood that within the scope of the appended claims, the application may be practiced otherwise than as specifically described herein.

I claim:

1. A method comprising:
   detecting a cell and performing signal strength measurements in respect of the cell;
   in respect of the cell, transmitting at least one measurement report using a first measurement report format; and
   in respect of the cell, transmitting at least one measurement report using a second measurement report format,
   wherein the first measurement report format is a measurement report format that includes cell identity; and
   wherein the second measurement report format is a measurement report format that does not include the cell identity; and
   wherein transmitting measurement reports comprises transmitting a defined sequence of measurement reports using the first measurement report format and measurement reports that use the second measurement report format.

2. The method of claim 1 further comprising:
   if the mobile station sends a measurement report for a cell, which it has not reported within a preceding defined time period, transmitting the measurement report using the first measurement report format, and sending at least a further N_min−1 reports for the same cell while the cell meets applicable measurement reporting criteria, the last of which uses the first measurement report format, wherein N_min is an integer parameter.

3. The method of claim 1 further comprising:
   after sending a measurement report in respect of the cell, so long as that cell continues to meet measurement reporting criteria, transmitting further measurement reports in respect of the cell over at least a defined time period.

4. The method of claim 1 further comprising:
   after sending a measurement report in respect of the cell, so long as that cell continues to meet measurement reporting criteria, transmitting measurement reports in respect of the cell such that at least N_RP_min measurement reports are transmitted that use the first measurement report format, wherein N_RP_min is an integer parameter.

5. The method of claim 1 further comprising:
   after sending a measurement report in respect of the cell, so long as that cell continues to meet measurement reporting criteria, transmitting measurement reports in respect of the cell such that at least N_RP_min measurement reports are transmitted using the first measurement report format, and such that no more than N_RP_max measurement reports using the first measurement report format are sent for the same cell in a defined period, wherein N_RP_min and N_RP_max are integer parameters.

6. The method of claim 1 further comprising:
   for at least one measurement report, including an indication of where the measurement report is in the defined sequence.

7. The method of claim 1 further comprising:
   for at least one measurement report, including an indication of where the measurement report is in a sequence of measurement reports.

8. The method of claim 1 wherein at least the first measurement report of the defined sequence uses the first measurement report format.

9. The method of claim 1 wherein the defined sequence is such that every Nth measurement report uses the first measurement report format, wherein N is an integer parameter.

10. The method of claim 1 applied in respect of a closed subscriber group (CSG) cell.

11. A method in a mobile station, the method comprising:
    detecting a cell and performing signal strength measurements in respect of the cell;
    if the mobile station sends a measurement report that includes cell identity for a cell which it has not reported within a preceding defined time period, until a defined minimum in respect of measurement reporting is satisfied continuing to transmit measurement reports for the cell while the cell meets applicable measurement reporting criteria comprising at least one of a minimum received signal strength and a minimum received signal quality, and
    after the defined minimum in respect of measurement reporting is satisfied, refraining from transmitting measurement reports in respect of the cell for a determined time period regardless of the cell meeting measurement reporting criteria.

12. The method of claim 11 wherein the defined minimum is a minimum time period.

13. The method of claim 11 wherein the defined minimum is a minimum number of measurement reports.

14. A mobile station comprising:
    an antenna;
    a wireless access radio in communication with the antenna; and
    a measurement report generator in communication with the wireless access radio and antenna, the measurement report generator configured to:
      detect a cell and performing signal strength measurements in respect of the cell;
      if the mobile station sends a measurement report that includes cell identity for a cell which it has not reported within a preceding defined time period, until a defined minimum in respect of measurement reporting is satisfied continue to transmit measurement reports for the cell while the cell meets applicable measurement reporting criteria comprising at least one of a minimum received signal strength and a minimum received signal quality, and
      after the defined minimum in respect of measurement reporting is satisfied, refrain from transmitting measurement reports in respect of the cell for a determined time period regardless of the cell meeting measurement reporting criteria.

15. The mobile station of claim 14 wherein the defined minimum is a minimum time period.

16. The mobile station of claim 14 wherein the defined minimum is a minimum number of measurement reports.

17. A non-transitory computer readable medium having stored thereon computer executable code that when executed by a processor of a mobile station causes the mobile station to:
    detect a cell and performing signal strength measurements in respect of the cell;
    if the mobile station sends a measurement report that includes cell identity for a cell which it has not reported within a preceding defined time period, until a defined minimum in respect of measurement reporting is satisfied continue to transmit measurement reports for the cell while the cell meets applicable measurement reporting criteria comprising at least one of a minimum received signal strength and a minimum received signal quality, and after the defined minimum in respect of measurement reporting is satisfied, refrain from transmitting measurement reports in respect of the cell for a determined time period regardless of the cell meeting measurement reporting criteria.

18. The non-transitory computer readable medium of claim 17 wherein the defined minimum is a minimum time period.

19. The non-transitory computer readable medium of claim 17 wherein the defined minimum is a minimum number of measurement reports.

* * * * *